(12) United States Patent
Yamashiro et al.

(10) Patent No.: US 10,789,974 B2
(45) Date of Patent: Sep. 29, 2020

(54) TONEARM UNIT AND PLAYBACK DEVICE

(71) Applicant: PANASONIC INTELLECTUAL PROPERTY MANAGEMENT CO., LTD., Osaka (JP)

(72) Inventors: Tomoyuki Yamashiro, Osaka (JP); Takaaki Kumazawa, Mie (JP); Takeru Sakamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/348,088

(22) PCT Filed: Oct. 23, 2017

(86) PCT No.: PCT/JP2017/038117
§ 371 (c)(1),
(2) Date: May 7, 2019

(87) PCT Pub. No.: WO2018/123232
PCT Pub. Date: Jul. 5, 2018

(65) Prior Publication Data
US 2020/0058321 A1    Feb. 20, 2020

(30) Foreign Application Priority Data

Dec. 28, 2016   (JP) .................. 2016-256002

(51) Int. Cl.
*G11B 3/08* (2006.01)
*G11B 3/085* (2006.01)
*G11B 3/60* (2006.01)

(52) U.S. Cl.
CPC ........ *G11B 3/08509* (2013.01); *G11B 3/0857* (2013.01); *G11B 3/60* (2013.01)

(58) Field of Classification Search
CPC ...... G11B 3/08509; G11B 3/0857; G11B 3/60
(Continued)

(56) References Cited

U.S. PATENT DOCUMENTS 3,307,851 A * 3/1967 Tourtellot ............ G11B 17/165
369/206
3,411,791 A * 11/1968 Dennis ................. G11B 17/16
369/206
(Continued)

FOREIGN PATENT DOCUMENTS

EP          0168106 A1    1/1986
JP          51-010904 A   1/1976
(Continued)

OTHER PUBLICATIONS

Extended European Search Report dated Nov. 21, 2019 for the corresponding European Patent Application No. 17889108.1.
(Continued)

*Primary Examiner* — Allen T Cao
(74) *Attorney, Agent, or Firm* — McDermott Will & Emery LLP

(57) ABSTRACT

A tonearm unit includes: an arm member having a tip to which a cartridge is attached; and a raising and lowering mechanism which raises and lowers the arm member with respect to a phonograph record along an axis. The raising and lowering mechanism includes: a cam base supporting the arm member; a ring cam provided to be rotatable about the axis with respect to the cam base; a first guide portion on the cam base, extending at an angle along a rotation direction of the ring cam; and a second guide portion on the ring cam, extending at an angle along the rotation direction so as to face the first guide portion. When the ring cam rotates with respect to the cam base, the cam base is raised and
(Continued)

lowered with respect to the ring cam as a result of the second guide portion sliding along the first guide portion.

11 Claims, 18 Drawing Sheets

(58) Field of Classification Search
USPC .......................................................... 369/216
See application file for complete search history.

(56) References Cited

U.S. PATENT DOCUMENTS

| | | | |
|---|---|---|---|
| 3,727,922 A | | 4/1973 | Igata |
| 3,973,777 A | | 8/1976 | Guha |
| 5,003,522 A | * | 3/1991 | Dolby ...................... G11B 3/10 369/128 |
| 6,154,435 A | | 11/2000 | Huang |

FOREIGN PATENT DOCUMENTS

| | | |
|---|---|---|
| JP | 51-082402 U | 7/1976 |
| JP | 06-187601 A | 7/1994 |

OTHER PUBLICATIONS

International Search Report and Written Opinion dated Dec. 19, 2017 in International Patent Application No. PCT/JP2017/038117; with partial English translation.

\* cited by examiner

TONEARM UNIT AND PLAYBACK DEVICE

CROSS-REFERENCE OF RELATED APPLICATIONS

This application is the U.S. National Phase under 35 U.S.C. § 371 of International Patent Application No. PCT/JP2017/038117, filed on Oct. 23, 2017, which in turn claims the benefit of Japanese Application No. 2016-256002filed on Dec. 28, 2016, the entire disclosures of which Applications are incorporated by reference herein.

TECHNICAL FIELD

The present disclosure relates to tonearm units and playback devices including the same.

BACKGROUND ART

Playback devices which play phonograph records (analog discs) are known. A tonearm unit for picking up an audio signal from a phonograph record is mounted in a playback device (for example, refer to Patent Literature (PTL) 1). The tonearm unit includes: a main body member; a base member disposed on the main body member; and an arm member supported on the base member. A cartridge including a record needle is detachably attached to the tip of the arm member.

In order to accurately pick up the audio signal from the phonograph record, it is necessary to keep the arm member in a substantially horizontal attitude when the record needle is tracing a groove of the phonograph record. Therefore, an existing tonearm unit includes a raising and lowering mechanism for adjusting the height of the arm member relative to the phonograph record to make the attitude of the arm member substantially horizontal.

The raising and lowering mechanism includes an adjustment ring which is rotatably disposed between the base member and the main body member. Six-threaded screws are formed on the inside of the adjustment ring and the outside of the base member, and these six-threaded screws are in mesh with each other. By rotating the adjustment ring with respect to the base member, the base member is raised and lowered with respect to the base member, and thus the height of the arm member relative to the phonograph record is adjusted.

CITATION LIST

Patent Literature

PTL 1: Japanese Unexamined Patent Application Publication No. H06-187601

SUMMARY OF THE INVENTION

Technical Problem

The present disclosure presents a tonearm unit and a playback device into which a raising and lowering mechanism can be easily incorporated.

Solution to Problem

A tonearm unit according to the present disclosure is used in a playback device which plays a phonograph record and includes: an arm member having a tip to which a cartridge is attached; and a raising and lowering mechanism which raises and lowers the arm member with respect to the phonograph record along a predetermined axis, wherein the raising and lowering mechanism includes: a supporting member which supports the arm member; a rotating member provided to be rotatable about the predetermined axis with respect to the supporting member; a first guide portion on the supporting member, the first guide portion extending at an angle along a rotation direction of the rotating member; and a second guide portion on the rotating member, the second guide portion facing the first guide portion and extending at an angle along the rotation direction, and when the rotating member rotates with respect to the supporting member, the supporting member is raised and lowered with respect to the rotating member as a result of the second guide portion sliding along the first guide portion.

Advantageous Effect of Invention

A raising and lowering mechanism can be easily incorporated into a tonearm unit according to the present disclosure.

DESCRIPTION OF EXEMPLARY EMBODIMENTS

Underlying Knowledge Forming Basis of the Present Disclosure

The inventors of the present application found that the following problem occurs in the technique described in the BACKGROUND ART section.

Upon incorporating the raising and lowering mechanism into the above-described existing tonearm unit, first, grease is applied to the six-threaded screws formed on the inside of the adjustment ring and the outside of the base member. Subsequently, the six-threaded screws are meshed with each other by aligning the ends of six threads of the six-threaded screw formed on the inside of the adjustment ring with the ends of six threads of the six-threaded screw formed on the outside of the base member. With this configuration, however, the problem of increased manhours for incorporating the raising and lowering mechanism occurs.

Hereinafter, exemplary embodiments will be described in detail with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

Note that the accompanying drawings and the subsequent description have been provided by the inventors in order for a person having ordinary skill in the art to sufficiently understand the present disclosure, and thus they are not intended to limit the scope of the subject matter of the appended Claims.

Embodiment 1

Embodiment 1 will be described below with reference to FIG. 1 to FIG. 15C.

[1-1. Overall Configuration of Playback Device]

Figure 1:
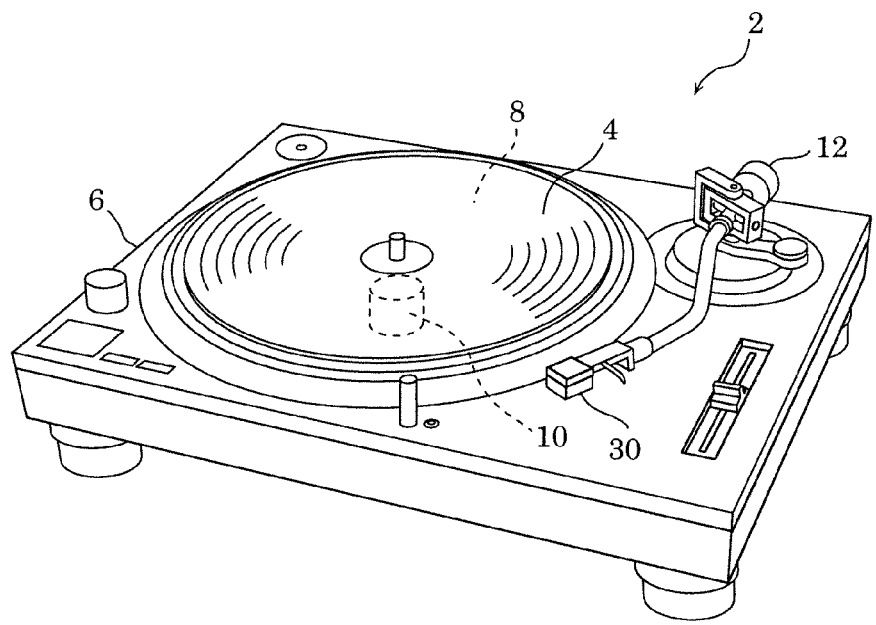
FIG. 1 is a perspective view illustrating a playback device according to Embodiment 1.

First, with reference to FIG. 1, the overall configuration of playback device 2 according to Embodiment 1 will be described. FIG. 1 is a perspective view illustrating playback device 2 according to Embodiment 1.

As illustrated in FIG. 1, playback device 2 is a device (what is called a phonograph) for playing phonograph record 4. Playback device 2 includes casing 6, turntable 8, drive source 10, and tonearm unit 12.

Casing 6 has the shape of a box approximately rectangular in plan view. Turntable 8 is a disc-shaped table for placing phonograph record 4 thereon and is rotatably supported on the topside of casing 6. Drive source 10 is a motor for rotating turntable 8 and is disposed inside casing 6.

Tonearm unit 12 is for picking up an audio signal from phonograph record 4 placed on rotating turntable 8 and is disposed on the topside of casing 6, adjacent to turntable 8. Playback device 2 according to the present embodiment is characterized by the configuration of tonearm unit 12. The configuration of tonearm unit 12 will be described in detail below.

[1-2. Configuration of Tonearm Unit]

[1-2-1. Overall Configuration of Tonearm Unit]

Figure 2:
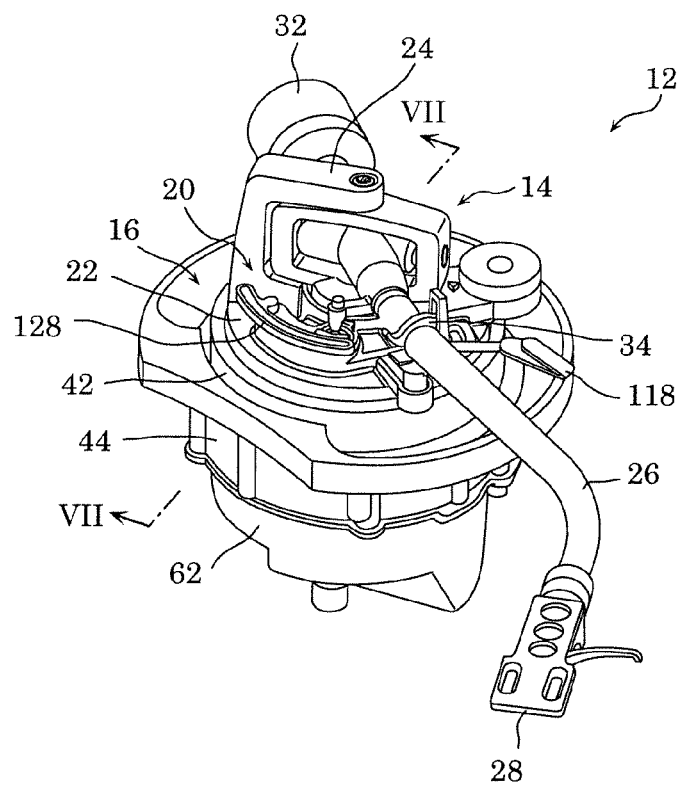
FIG. 2 is a perspective view illustrating a tonearm unit according to Embodiment 1.
Figure 3:
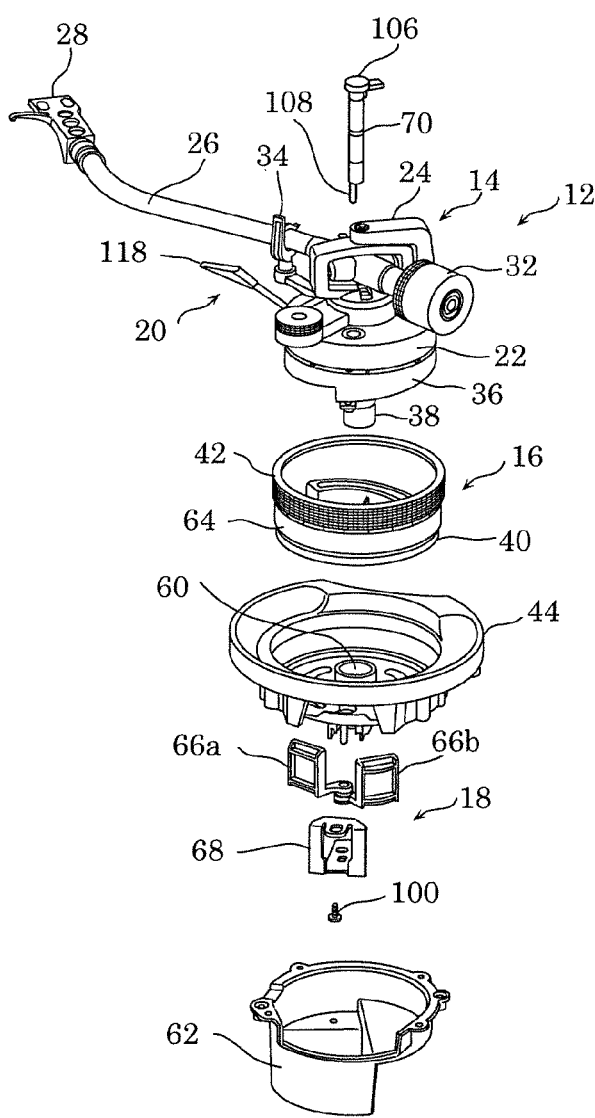
FIG. 3 is an exploded perspective view illustrating a tonearm unit according to Embodiment 1.
Figure 4:
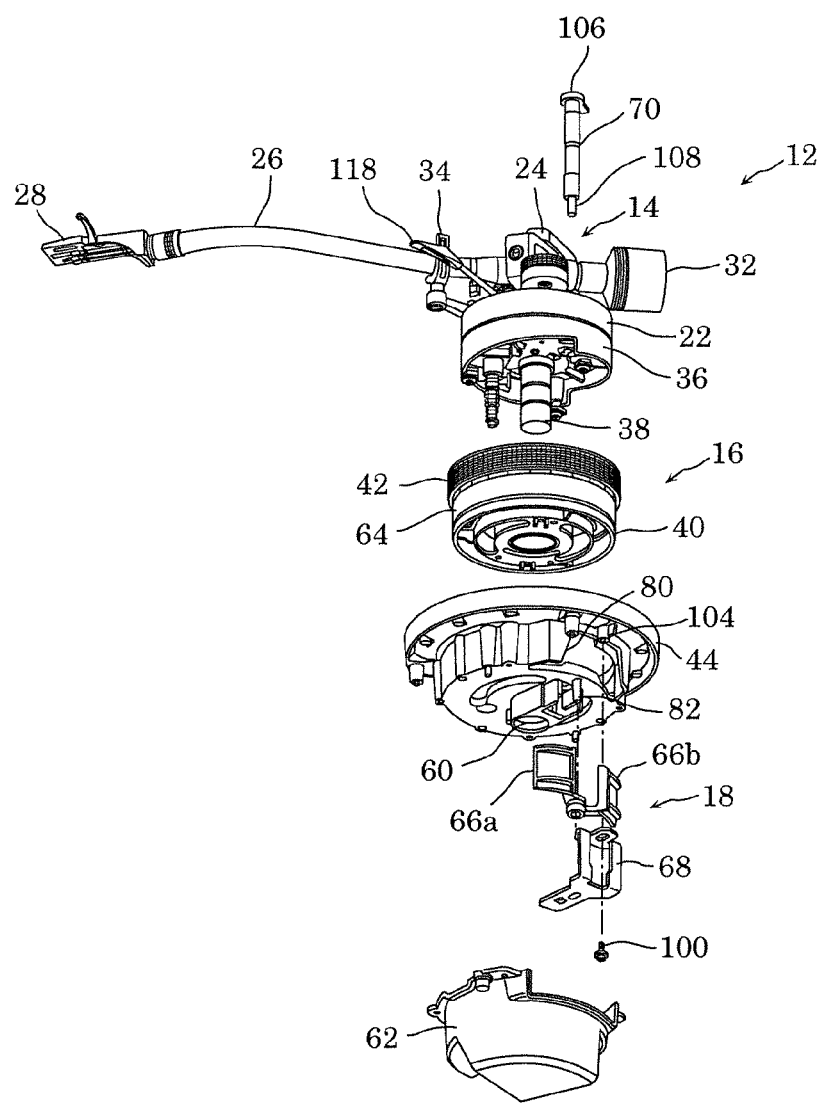
FIG. 4 is an exploded perspective view illustrating a tonearm unit according to Embodiment 1 viewed at an angle different from that in FIG. 3.

Next, with reference to FIG. 2 to FIG. 4, the overall configuration of tonearm unit 12 according to Embodiment 1 will be described. FIG. 2 is a perspective view illustrating tonearm unit 12 according to Embodiment 1. FIG. 3 is an exploded perspective view illustrating tonearm unit 12 according to Embodiment 1. FIG. 4 is an exploded perspective view illustrating tonearm unit 12 according to Embodiment 1 viewed at an angle different from that in FIG. 3.

As illustrated in FIG. 2 to FIG. 4, tonearm unit 12 includes tonearm 14, raising and lowering mechanism 16, locking mechanism 18, and lifter mechanism 20. Each of these structural elements of tonearm unit 12 will be described in detail below.

[1-2-2. Tonearm]

First, tonearm 14 will be described with reference to FIG. 2 to FIG. 4.

As illustrated in FIG. 2 to FIG. 4, tonearm 14 includes arm base 22, supporting mechanism 24, and arm member 26.

Arm base 22 is a member for supporting arm member 26, etc., and is formed in the shape of a circle in plan view.

Supporting mechanism 24 is for supporting the proximal end portion of arm member 26 to allow horizontal and vertical swinging and is disposed on the topside of arm base 22.

Arm member 26 extends longitudinally as it bends into the shape of approximate S in the horizontal plane. Head-shell 28 is supported at the tip of arm member 26. Cartridge 30 (refer to FIG. 1) including a record needle is detachably attached to head-shell 28. Furthermore, balance weight 32 is supported at the proximal end portion of arm member 26 to balance with the weight of head-shell 28.

Note that a user causes arm member 26 to be supported by hook-shaped arm rest 34 placed on the topside of arm base 22 while phonograph record 4 is not played. In order to play phonograph record 4, a user detaches arm member 26 from arm rest 34 and then places arm member 26 on mounting pedestal 128 (to be described later) by swinging arm member 26 horizontally and vertically. As will be described later, mounting pedestal 128 is lowered with arm member 26 placed thereon, and thus head-shell 28 approaches phonograph record 4 on turntable 8, allowing the record needle of cartridge 30 to trace the groove of record phonograph record 4.

[1-2-3. Raising and Lowering Mechanism]

[1-2-3-1. Configuration of Raising and Lowering Mechanism]

Figure 5:
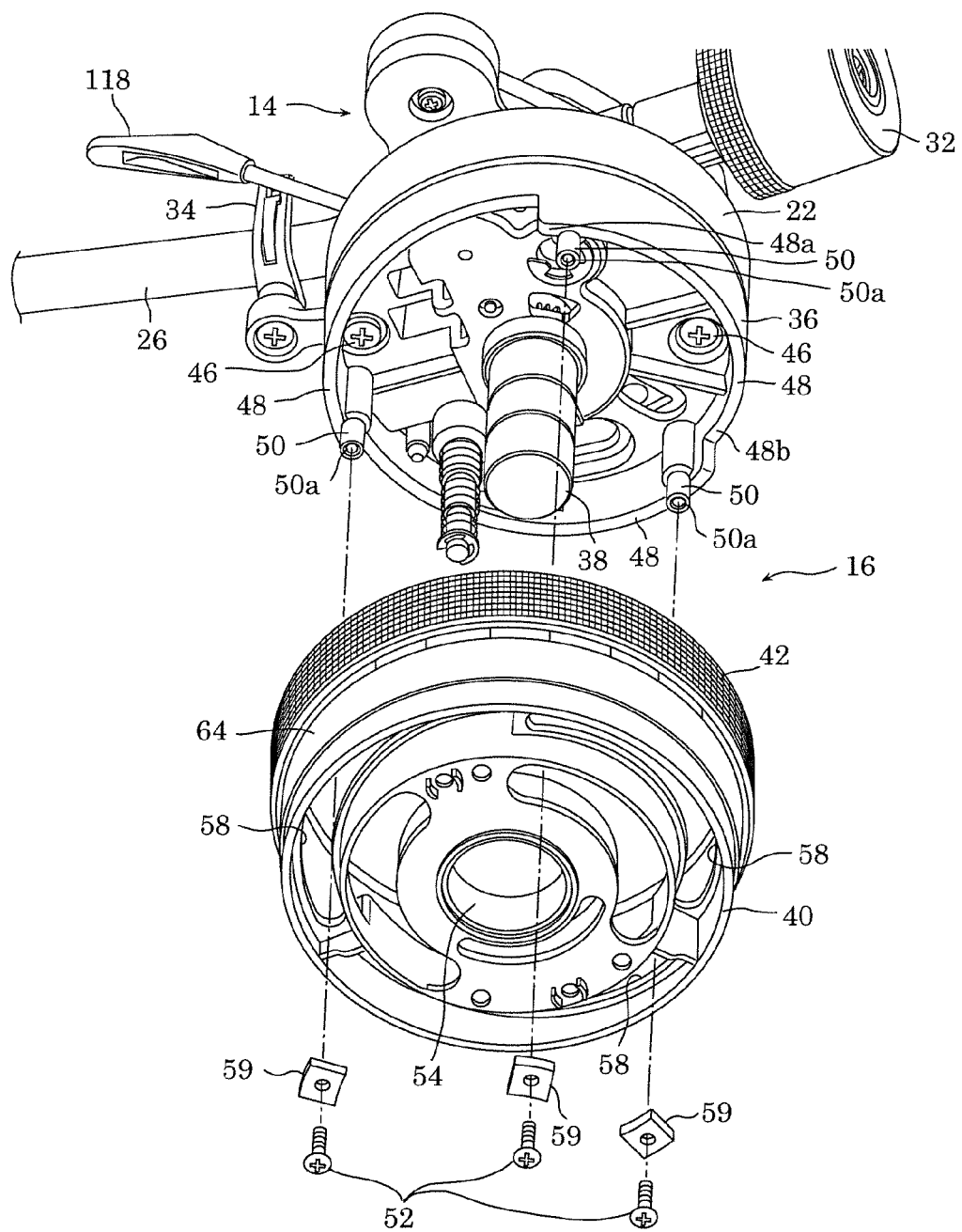
FIG. 5 is an exploded perspective view illustrating a raising and lowering mechanism according to Embodiment 1.
Figure 6:
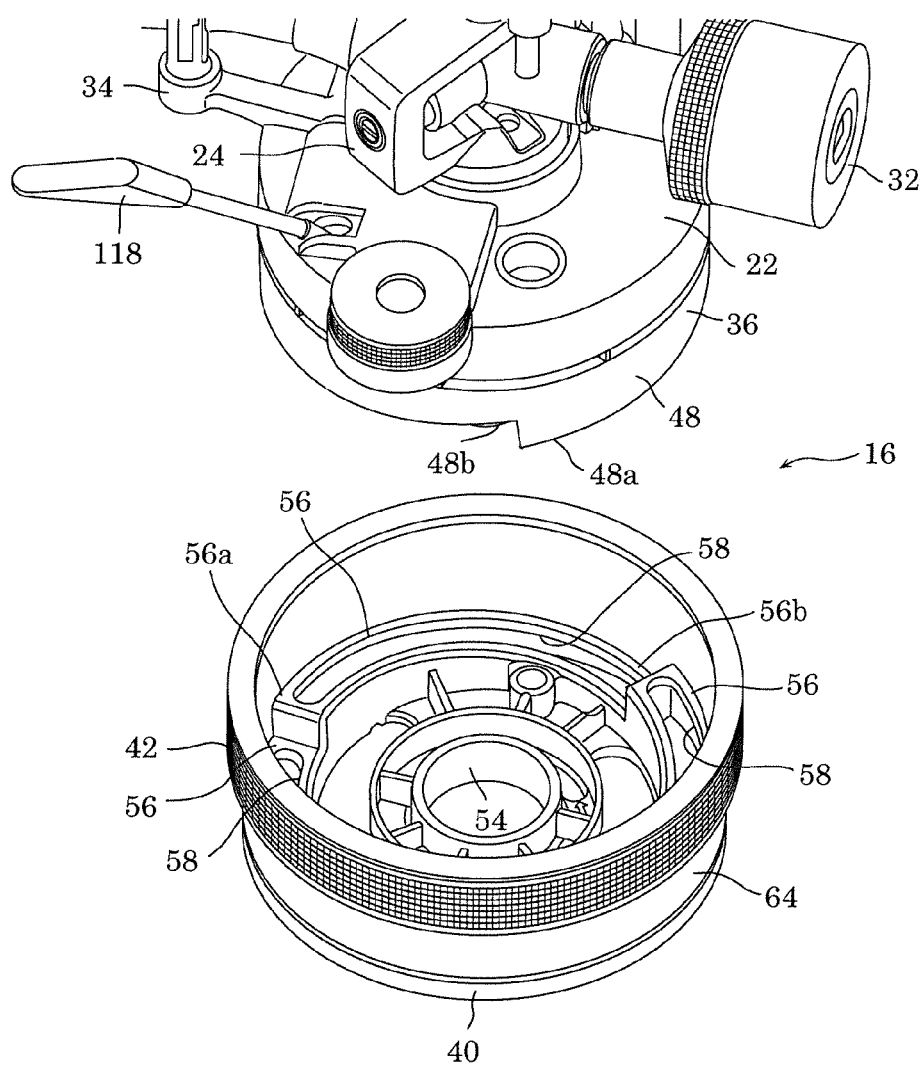
FIG. 6 is an exploded perspective view illustrating a raising and lowering mechanism according to Embodiment 1 viewed at an angle different from that in FIG. 5.
Figure 7A:
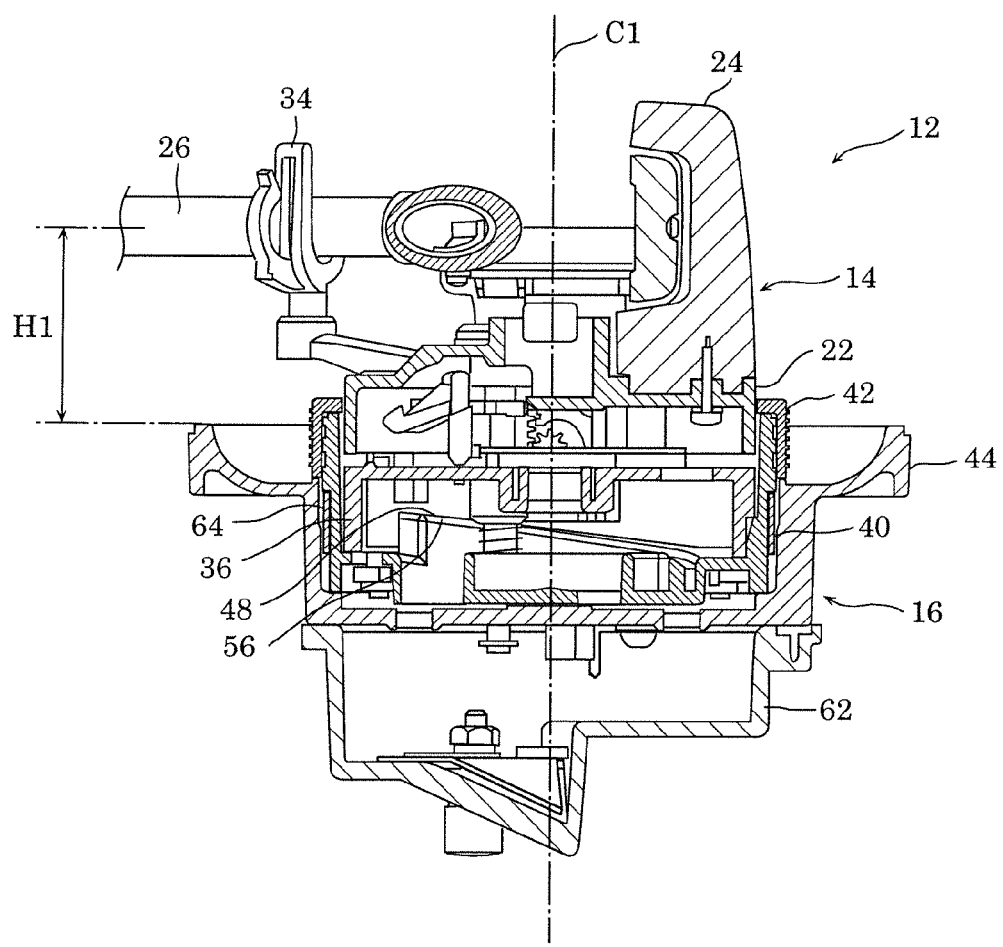
FIG. 7A is a cross-sectional view taken along line VII-VII of FIG. 2 with an arm member lowered to the maximum extent possible.
Figure 7B:
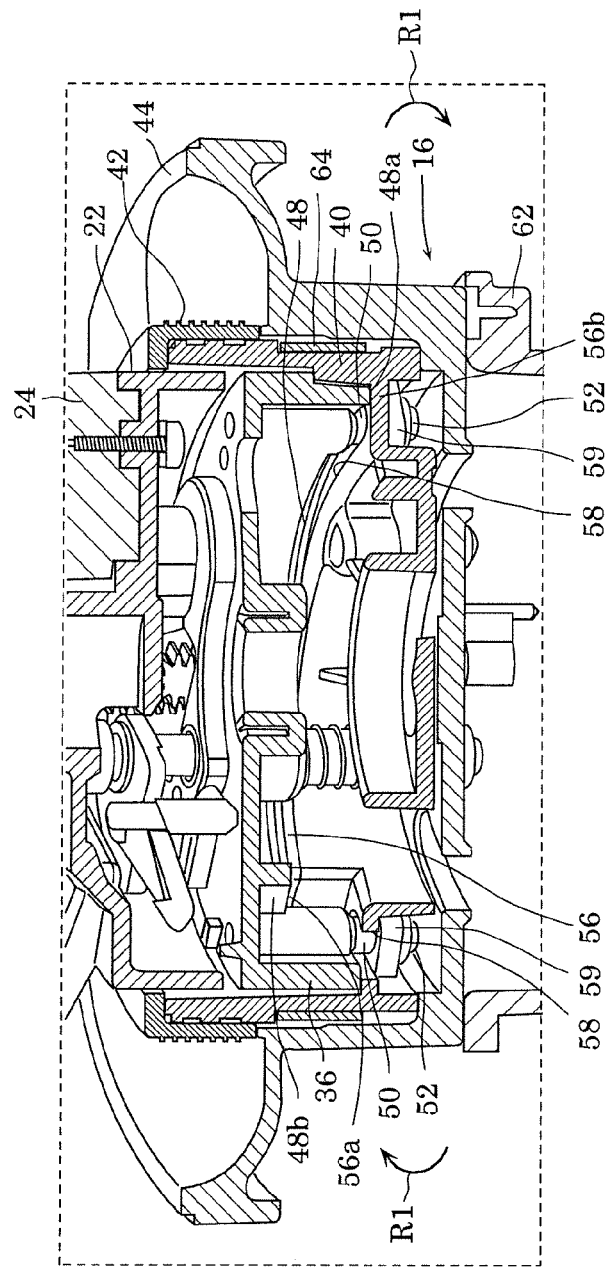
FIG. 7B is an enlarged cross-sectional perspective view of a portion in FIG. 7A.

Next, the configuration of raising and lowering mechanism 16 will be described with reference to FIG. 3 to FIG. 7B. FIG. 5 is an exploded perspective view illustrating raising and lowering mechanism 16 according to Embodiment 1. FIG. 6 is an exploded perspective view illustrating raising and lowering mechanism 16 according to Embodiment 1 viewed at an angle different from that in FIG. 5. FIG. 7A is a cross-sectional view taken along line VII-VII of FIG. 2 with arm member 26 lowered to the maximum extent possible. FIG. 7B is an enlarged cross-sectional perspective view of a portion in FIG. 7A.

Raising and lowering mechanism 16 is for raising and lowering arm member 26 with respect to phonograph record 4 on turntable 8. As illustrated in FIG. 3 and FIG. 4, raising and lowering mechanism 16 includes cam base 36 (one example of the supporting member), center shaft 38, ring cam 40 (one example of the rotating member), handle ring 42, and arm base mount 44.

As illustrated in FIG. 5 to FIG. 7A, cam base 36 is formed in the shape of a disc and fixed to the underside of arm base 22 by a plurality of screws 46. In other words, cam base 36 supports arm member 26 via arm base 22.

As illustrated in FIG. 5, a plurality of (in the present embodiment, three) first guide portions 48 are formed on an outer peripheral portion of the underside of cam base 36. The plurality of first guide portions 48 are arranged side by side along the rotation direction of ring cam 40 (that is, the circumferential direction of cam base 36). Each of the plurality of first guide portions 48 extends at an angle along the rotation direction of ring cam 40. Specifically, each of the plurality of first guide portions 48 extends in a circular arc shape by tilting up from peak portion 48a to valley portion 48b.

Furthermore, as illustrated in FIG. 5, a plurality of (in the present embodiment, three) protruding portions 50 are formed on the outer peripheral portion of the underside of cam base 36. The plurality of protruding portions 50 extend vertically downward from the underside of cam base 36 and are arranged at intervals along the rotation direction of ring cam 40. Screw hole 50a for allowing screwing of withdrawal prevention screw 52 is formed at the tip of each of the plurality of protruding portions 50.

Center shaft 38 is formed in the shape of a circular cylinder and extends vertically downward from a central portion of the underside of cam base 36. Central axis C1 (one example of a predetermined axis) of center shaft 38 extends vertically and functions as a raising and lowering axis for cam base 36 to be raised and lowered with respect to ring cam 40 as will be described later. Furthermore, central axis C1 of center shaft 38 functions as a rotation axis for ring cam 40 to rotate with respect to cam base 36 as will be described later. Note that center shaft 38 is formed from a metal such as a free machining steel or brass, for example.

As illustrated in FIG. 5 to FIG. 7A, ring cam 40 is formed in the shape of a bottomed circular cylinder and is disposed in a position covering the outside and the underside of cam base 36. Hole 54 in the shape of a circle for allowing insertion of center shaft 38 is formed at a central portion of the bottom of ring 40. Ring cam 40 is capable of rotating with respect to cam base 36 around central axis C1 of center shaft 38.

As illustrated in FIG. 6, a plurality of (in the present embodiment, three) second guide portions 56 are formed on an outer peripheral portion of the topside of the bottom of ring cam 40. The plurality of second guide portions 56 are arranged side by side along the rotation direction of ring cam 40 (that is, the circumferential direction of ring cam 40) in one-to-one correspondence with the plurality of first guide portions 48. Each of the plurality of second guide portions 56 extends at an angle along the rotation direction of ring cam 40 so as to face a corresponding one of first guide portions 48. Specifically, each of the plurality of second guide portions 56 extends in a circular arc shape by tilting up from valley portion 56b to peak portion 56a. As illustrated in FIG. 7A and FIG. 7B, each of the plurality of second guide portions 56 is in close proximity to the plurality of first guide portions 48, and a gap of about 0.1 mm is formed between first guide portion 48 and second guide portion 56, for example.

Furthermore, as illustrated in FIG. 5 and FIG. 6, a plurality of (in the present embodiment, three) groove portions 58 are formed on an outer peripheral portion of the bottom of ring cam 40. The plurality of groove portions 58 are arranged at intervals along the rotation direction of ring cam 40 in one-to-one correspondence with the plurality of second guide portions 56. Each of the plurality of groove portions 58 extends in a circular arc shape along a corresponding one of second guide portions 56. The plurality of protruding portions 50 of cam base 36 are movably inserted into the plurality of groove portions 58, respectively. As illustrated in FIG. 5 and FIG. 7B, withdrawal prevention screw 52 is screwed into screw hole 50a of each of the plurality of protruding portions 50 via cam spacer 59 (one example of the withdrawal prevention member). Specifically, cam spacer 59 is attached to the tip of protruding portion 50 by withdrawal prevention screw 52. Withdrawal prevention screw 52 and cam spacer 59 are disposed on the opposite side of groove portion 58 from cam base 36. The width of cam spacer 59 is greater than the width of groove portion 58. With the plurality of cam spacers 59, it is possible to reduce the occurrence of protruding portions 50 being withdrawn from groove portions 58 (in other words, the occurrence of cam base 36 being detached from ring cam 40).

As illustrated in FIG. 5 to FIG. 7A, handle ring 42 is attached to the outside of an upper end portion of ring cam 40. A user can rotate ring cam 40 with respect to cam base 36 by holding handle ring 42 with his or her hand fingers.

As illustrated in FIG. 2 to FIG. 4 and FIG. 7A, arm base mount 44 is formed in the shape of a bottomed circular cylinder and is disposed in a position covering the outside and the underside of the bottom of ring cam 40. Hole 60 in the shape of a circle for allowing insertion of center shaft 38 is formed at a central portion of the bottom of arm base mount 44. Ring cam 40 is rotatably supported on the topside of the bottom of arm base mount 44. Note that arm base mount 44 is formed from a metal, for example, by aluminum die casting or the like.

Jack base 62 is attached to a lower end portion of arm base mount 44. A jack substrate (not illustrated in the drawings) or the like on which a jack terminal is mounted is disposed inside jack base 62.

[1-2-3-2. Operations of Raising and Lowering Mechanism]

Figure 8A:
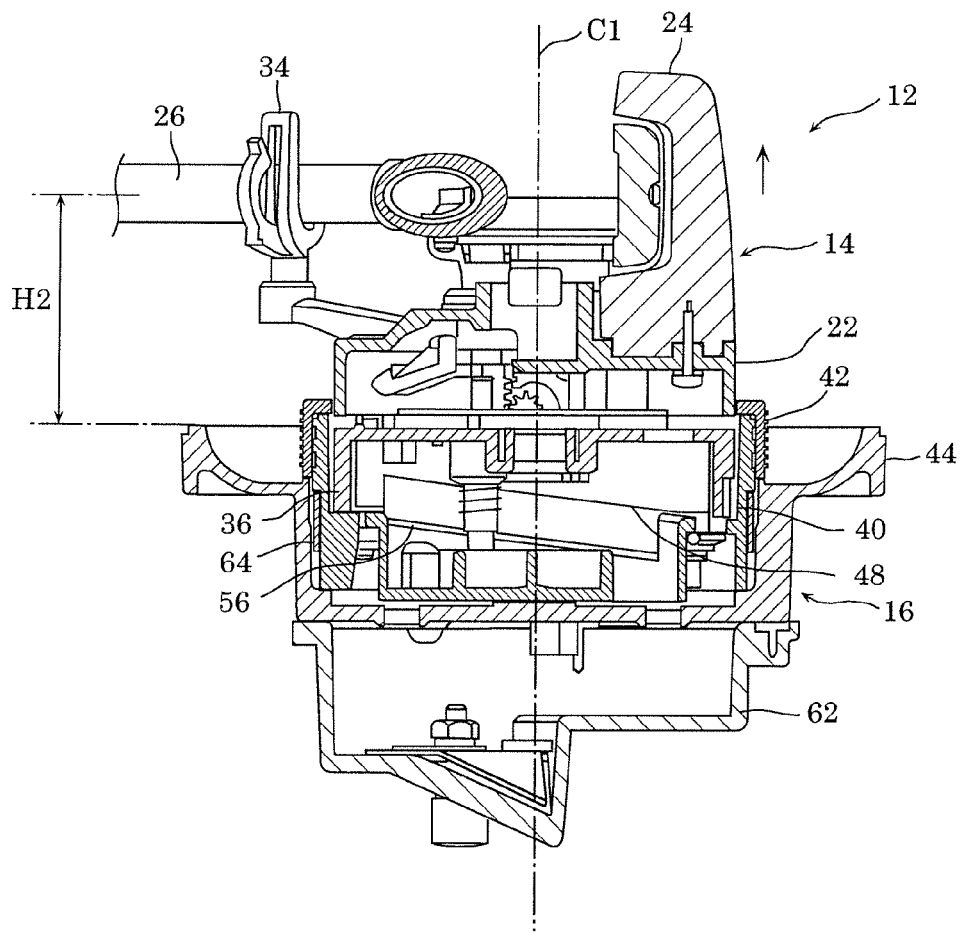
FIG. 8A is a cross-sectional view taken along line VII-VII of FIG. 2 with an arm member raised to the maximum extent possible.
Figure 8B:
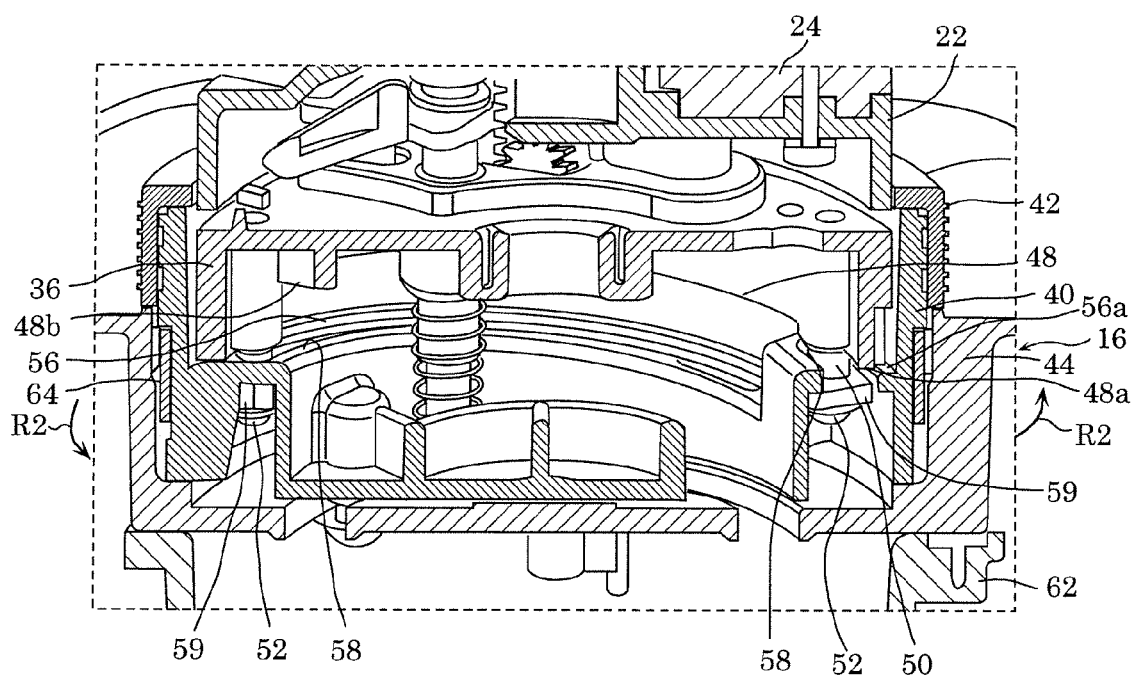
FIG. 8B is an enlarged cross-sectional perspective view of a portion in FIG. 8A.

Next, the operations of raising and lowering mechanism 16 will be described with reference to FIG. 7A to FIG. 8B. FIG. 8A is a cross-sectional view taken along line VII-VII of FIG. 2 with arm member 26 raised to the maximum extent possible. FIG. 8B is an enlarged cross-sectional perspective view of a portion in FIG. 8A.

In the state illustrated in FIG. 7A and FIG. 7B, peak portion 56a of each of the plurality of second guide portions 56 faces valley portion 48b of a corresponding one of first guide portions 48. In this state, arm member 26 is at the lowest level relative to phonograph record 4 on turntable 8, and height H1 of arm member 26 relative to the upper end surface of arm base mount 44 is smallest.

A user rotates ring cam 40 in this state with respect to cam base 36 through a predetermined angle (for example, +120°) in the direction indicated by arrow R1 in FIG. 7B, resulting in each of the plurality of second guide portions 56 sliding along a corresponding one of the plurality of first guide portions 48. At this time, peak portion 56a of each of the plurality of second guide portions 56 moves from valley portion 48b to peak portion 48a of a corresponding one of first guide portions 48. Thus, cam base 36 is lifted up by peak portion 56a of each of the second guide portions 56 and thus is raised with respect to ring cam 40 along central axis C1 of center shaft 38. Accordingly, together with cam base 36 and arm base 22, arm member 26 is raised with respect to phonograph record 4 on turntable 8 along central axis C1 of center shaft 38. Note that while ring cam 40 is rotated with respect to cam base 36, protruding portion 50 of cam base 36 moves along groove portion 58 from one end to the other end of groove portion 58.

In the state illustrated in FIG. 8A and FIG. 8B, peak portion 56a of each of the plurality of second guide portions 56 faces peak portion 48a of a corresponding one of first guide portions 48. In this state, arm member 26 is at the highest level relative to phonograph record 4 on turntable 8, and height H2 (>H1) of arm member 26 relative to the upper end surface of arm base mount 44 is largest. Note that the difference (H2-H1) between height H2 and height H1 is, for example, approximately 6 mm.

A user rotates ring cam 40 in this state with respect to cam base 36 through a predetermined angle (for example, −120°) in the direction indicated by arrow R2 in FIG. 8B, resulting in each of the plurality of second guide portions 56 sliding along a corresponding one of the plurality of first guide portions 48. At this time, peak portion 56a of each of the plurality of second guide portions 56 moves from peak portion 48a to valley portion 48b of a corresponding one of first guide portions 48. Thus, cam base 36 is lowered with respect to ring cam 40 along central axis C1 of center shaft 38. Accordingly, together with cam base 36 and arm base 22, arm member 26 is lowered with respect to phonograph record 4 on turntable 8 along central axis C1 of center shaft 38. Note that while ring cam 40 is rotated with respect to cam base 36, protruding portion 50 of cam base 36 moves along groove portion 58 from one end to the other end of groove portion 58.

By raising and lowering arm member 26 with respect to phonograph record 4 on turntable 8 as described above, it is possible to adjust the height of arm member 26 relative to phonograph record 4. Thus, the substantially horizontal attitude of arm member 26 can be maintained when the record needle is tracing the groove of phonograph record 4, and thus it is possible to accurately pick up the audio signal from phonograph record 4.

[1-2-4. Locking Mechanism]

[1-2-4-1. Configuration of Locking Mechanism]

Figure 9:
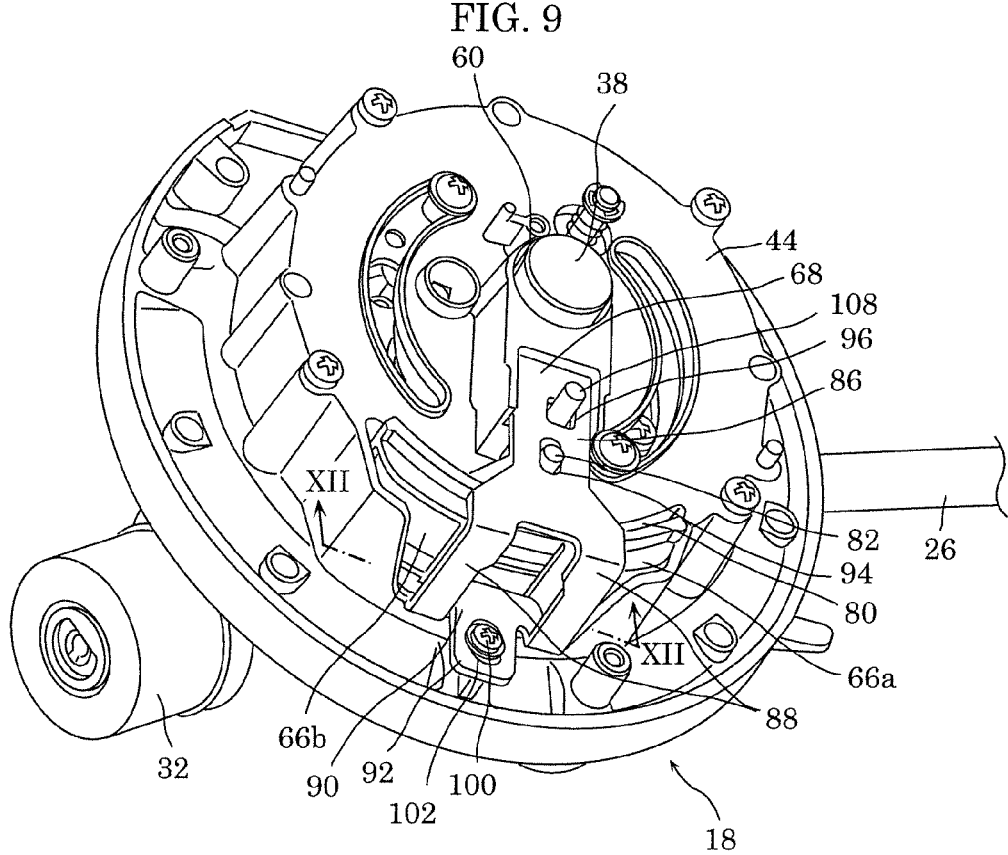
FIG. 9 is a perspective view illustrating a locking mechanism according to Embodiment 1.
Figure 10:
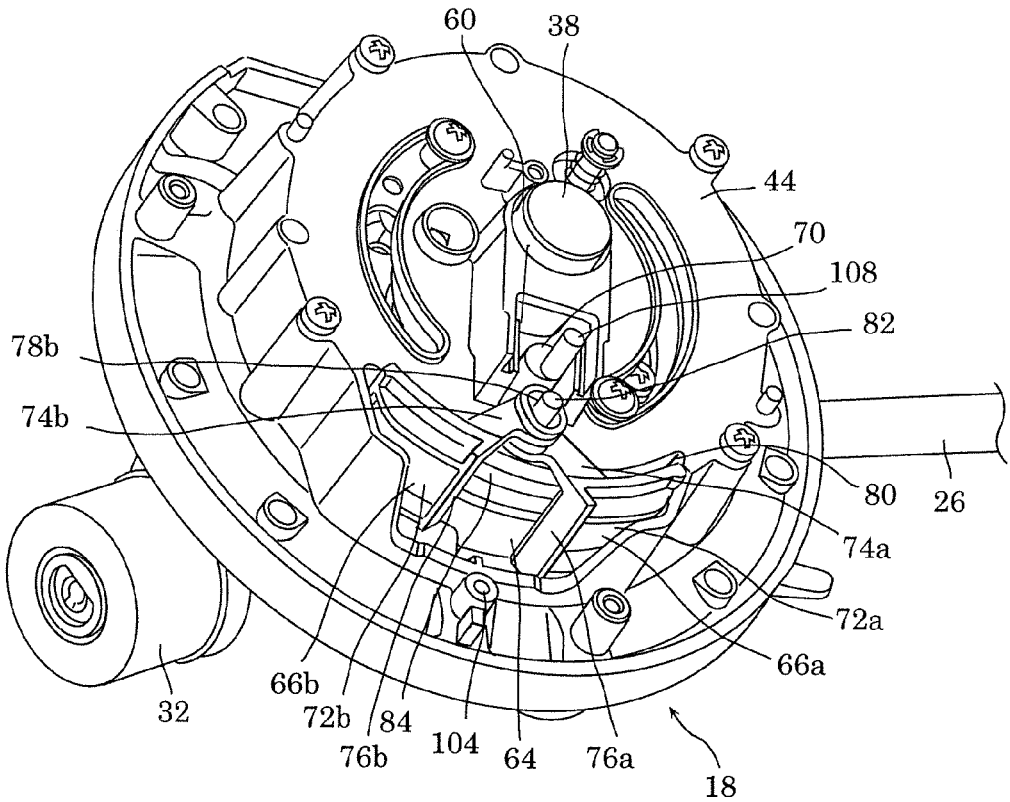
FIG. 10 is a perspective view illustrating a locking mechanism according to Embodiment 1 in which a locking plate is omitted.
Figure 11:
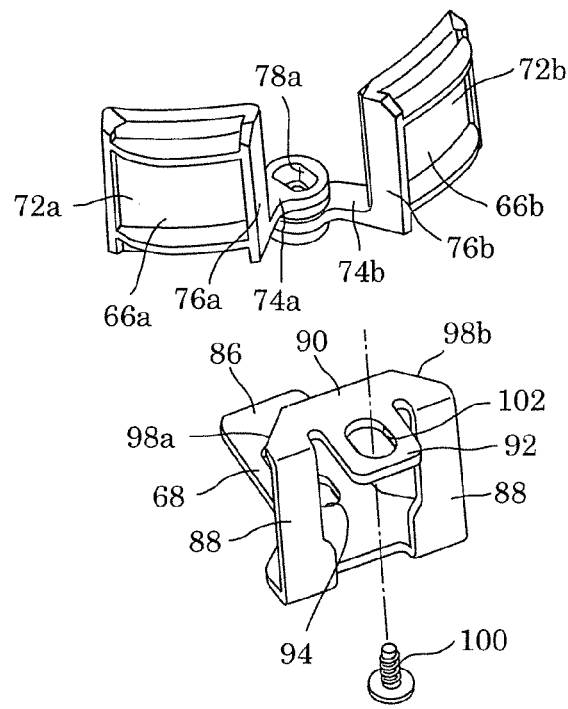
FIG. 11 is a perspective view illustrating a portion of a locking mechanism according to Embodiment 1.

Next, the configuration of locking mechanism 18 will be described with reference to FIG. 3 to FIG. 5 and FIG. 9 to FIG. 11. FIG. 9 is a perspective view illustrating locking mechanism 18 according to Embodiment 1. FIG. 10 is a perspective view illustrating locking mechanism 18 according to Embodiment 1 in which locking plate 68 is omitted. FIG. 11 is a perspective view illustrating a portion of locking mechanism 18 according to Embodiment 1. Note that for illustrative purposes, illustrations of jack base 62, etc., are omitted in FIG. 9 and FIG. 10.

Locking mechanism 18 is for locking (restricting) rotation of ring cam 40 with respect to cam base 36. As illustrated in FIG. 3, FIG. 4, and FIG. 9, locking mechanism 18 includes ring rubber 64 (one example of the elastic member), a pair of locking supports 66a, 66b (one example of the contacting member), locking plate 68, and locking shaft 70 (one example of the operating member).

As illustrated in FIG. 3 to FIG. 5, ring rubber 64 is attached to the outside of ring cam 40 and extends in a ring shape along the entire perimeter of the outside of ring cam 40. Ring rubber 64 is formed from a rubber material, for example. Although ring rubber 64 is formed from a rubber material in the present embodiment, this is not limiting; for example, various elastic materials such as a resin material may be used.

The pair of locking supports 66a, 66b are members movably attached to arm base mount 44 and used to lock the rotation of ring cam 40 with respect to cam base 36 by contacting ring rubber 64. Note that the pair of locking supports 66a, 66b are formed from a resin, for example.

As illustrated in FIG. 11, locking support 66a includes support body portion 72a and attachment piece 74a. Support body portion 72a is formed in a plate-like shape and is curved along the circumferential direction of the outside of ring cam 40. Inclined surface 76a is formed on one lateral side of support body portion 72a. Attachment piece 74a extends from the concave surface side of support body portion 72a. Elongated hole 78a is formed in attachment piece 74a.

As illustrated in FIG. 11, locking support 68b is formed laterally mirrored with locking support 68a described above. Specifically, locking support 68b includes support body portion 72b and attachment piece 74b. Support body portion 72b is formed in a plate-like shape and is curved along the circumferential direction of the outside of ring cam 40. Inclined surface 76b is formed on one lateral side of support body portion 72b. Attachment piece 74b extends from the concave surface side of support body portion 72b. Elongated hole 78b is formed in attachment piece 74b.

As illustrated in FIG. 3, FIG. 4, FIG. 9, and FIG. 10, the pair of locking supports 66a, 66b are disposed on cutout portion 80 formed on a side wall portion of arm base mount 44 and adjacent to each other so that respective attachment pieces 74a, 74b face each other. Note that a part of ring rubber 64 is exposed to the outside of arm base mount 44 through cutout portion 80 of arm base mount 44. Therefore, the concave surface sides of respective support body portions 72a, 72b of the pair of locking supports 66a, 66b face a part of ring rubber 64.

As illustrated in FIG. 10, protrusions 82 formed on the underside of the bottom of arm base mount 44 are movably inserted in elongated holes 78*a*, 78*b* of respective attachment pieces 74*a*, 74*b* of the pair of locking supports 66*a*, 66*b*. With this, each of the pair of locking supports 66*a*, 66*b* is movable between a released position (refer to FIG. 12B and FIG. 12C to be described later) in which support body portions 72*a*, 72*b* separate from ring rubber 64 and a locked position (refer to FIG. 13B and FIG. 13C to be described later) in which support body portions 72*a*, 72*b* contact ring rubber 64. Note that as illustrated in FIG. 10, cushion member 84 which is elastic is interposed between a peripheral portion of cutout portion 80 of arm base mount 44 and support body portions 72*a*, 72*b* of the pair of locking supports 66*a*, 66*b*.

Locking plate 68 is a member for pushing each of the pair of locking supports 66*a*, 66*b* from the released position to the locked position. Note that locking plate 68 is formed from a metal such as iron, for example. As illustrated in FIG. 3, FIG. 4, FIG. 9, and FIG. 11, locking plate 68 includes horizontal portion 86, vertical portion 88, pusher portion 90, and attachment portion 92.

Horizontal portion 86 has: elongated hole 94 in which protrusion 82 of arm base mount 44 is movably inserted; and hole 96 in which eccentric shaft 108 (to be described later) of locking shaft 70 is rotatably inserted. Vertical portion 88 extends from one end portion of horizontal portion 86 substantially perpendicularly with respect to horizontal portion 86. Pusher portion 90 is formed at one end portion of vertical portion 88 and extends substantially perpendicularly with respect to vertical portion 88. A pair of inclined portions 98*a*, 98*b* are formed at both end portions of pusher portion 90. Attachment portion 92 extends from a central portion of pusher portion 90 in a direction substantially parallel to horizontal portion 86. Elongated hole 102 for allowing insertion of screw 100 is formed in attachment portion 92.

Figure 12A:
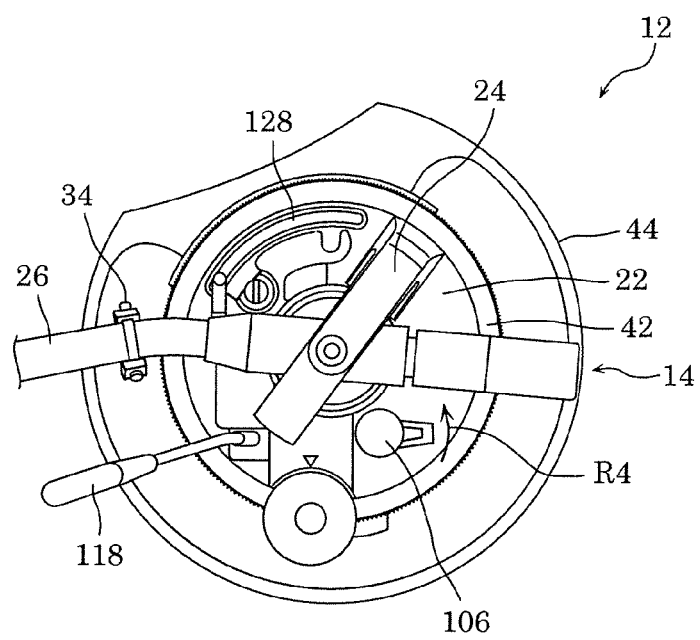
FIG. 12A is a plan view illustrating a tonearm unit according to Embodiment 1 with a pair of locking supports each in a released position.
Figure 12B:
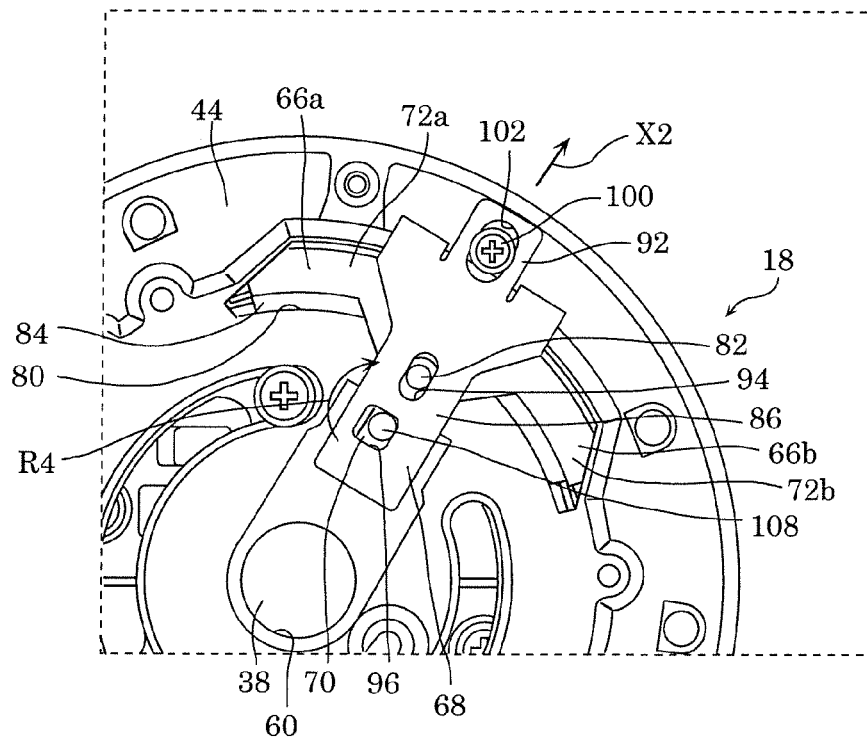
FIG. 12B is an enlarged view of a portion of a locking mechanism according to Embodiment 1 with a pair of locking supports each in a released position.
Figure 12C:
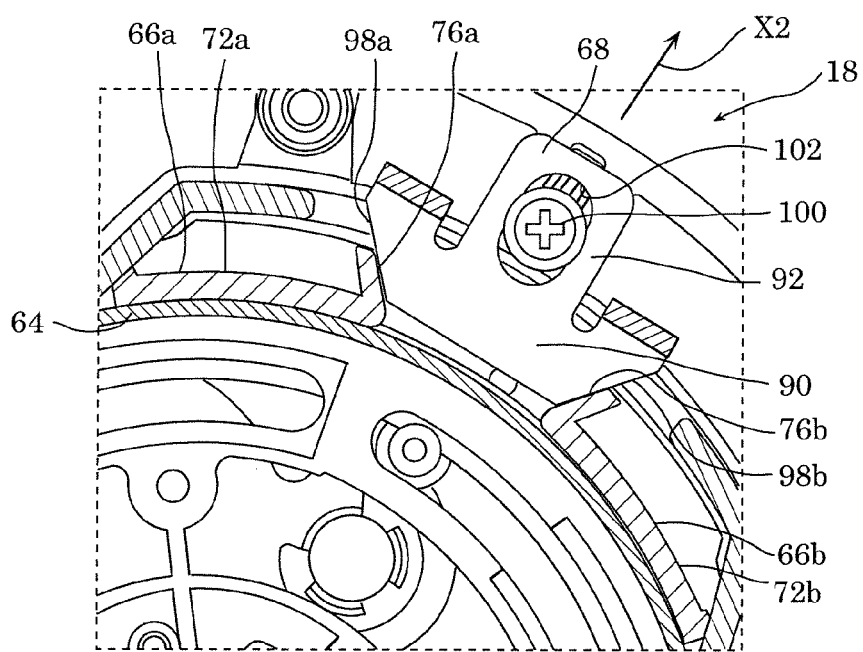
FIG. 12C is a cross-sectional view taken along line XII-XII of FIG. 9 with a pair of locking supports each in a released position.
Figure 13A:
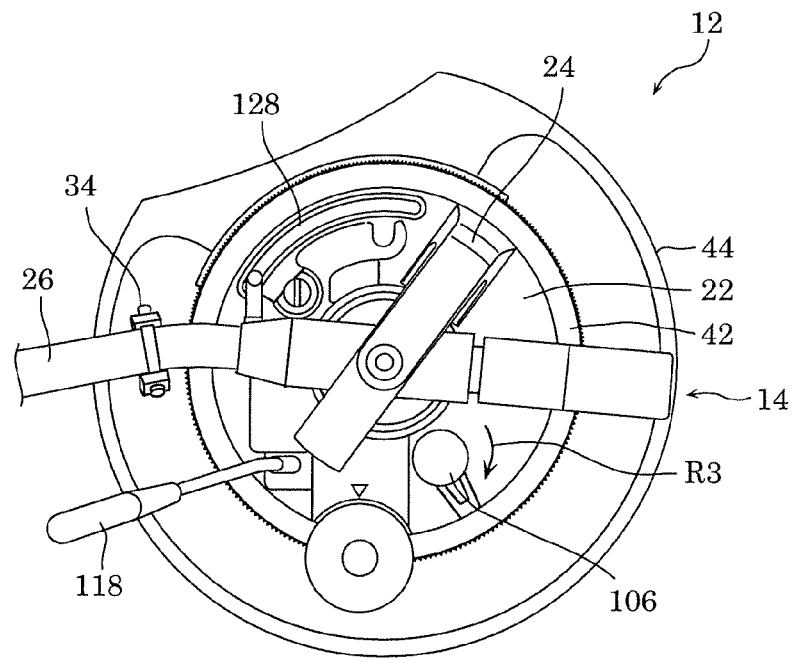
FIG. 13A is a plan view illustrating a tonearm unit according to Embodiment 1 with a pair of locking supports each in a locked position.
Figure 13B:
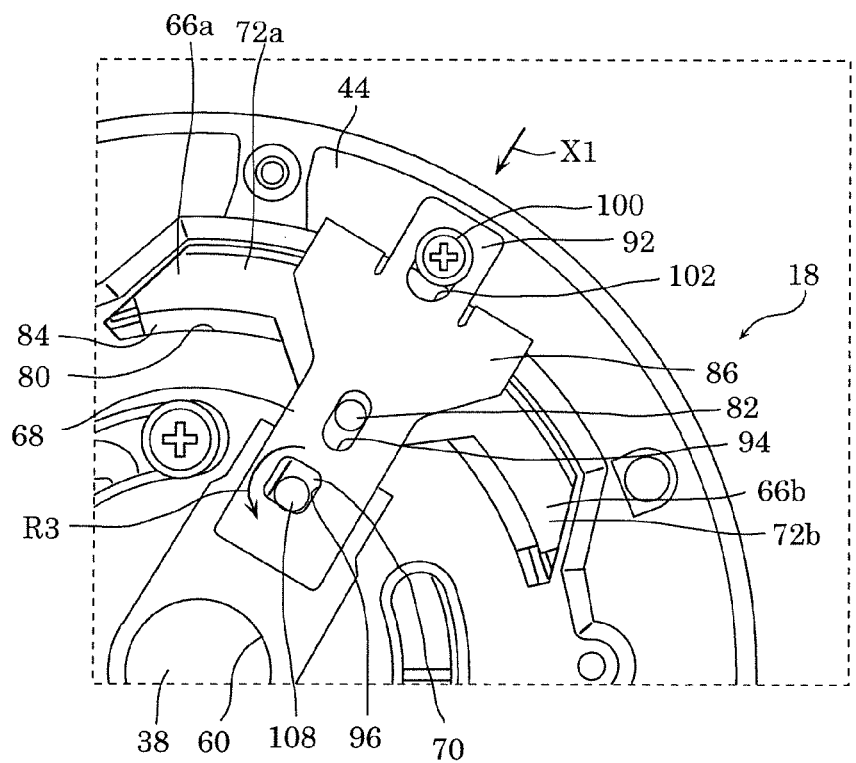
FIG. 13B is an enlarged view of a portion of a locking mechanism according to Embodiment 1 with a pair of locking supports each in a locked position.
Figure 13C:
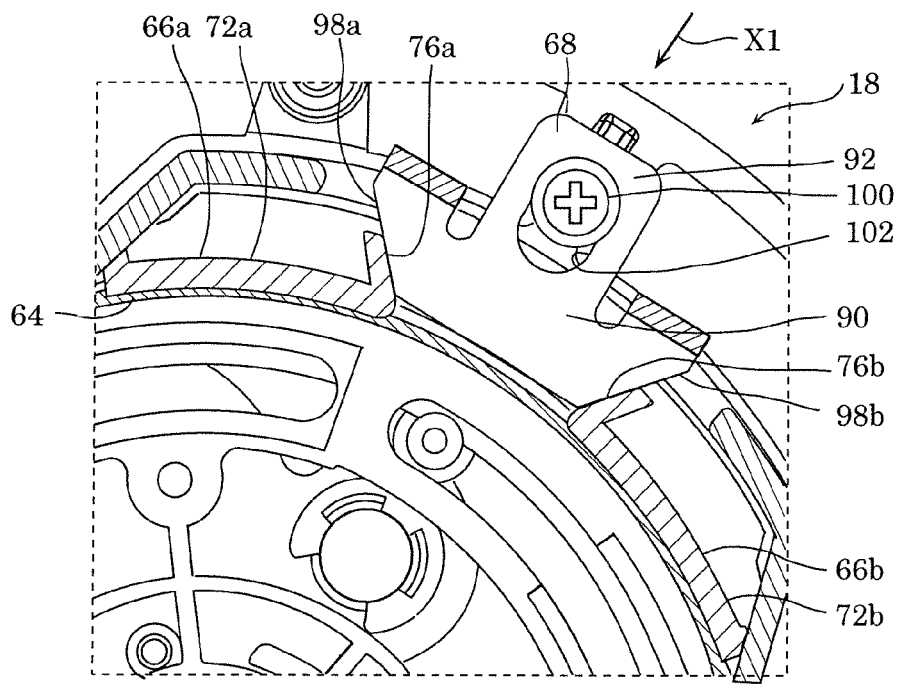
FIG. 13C is a cross-sectional view taken along line XII-XII of FIG. 9 with a pair of locking supports each in a locked position.

As illustrated in FIG. 9, screw 100 is screwed into screw hole 104 (refer to FIG. 10) of arm base mount 44 through elongated hole 102 of attachment portion 92, and thus locking plate 68 is attached to arm base mount 44. At this time, there is clearance between screw 100 and elongated hole 102, and therefore locking plate 68 can reciprocate in the radial direction of arm base mount 44. Protrusion 82 of arm base mount 44 is movably inserted in elongated hole 94 of horizontal portion 86. Furthermore, as illustrated in FIG. 12C and FIG. 13C to be described later, the pair of inclined portions 98*a*, 98*b* of pusher portion 90 are respectively in contact with inclined surfaces 76*a*, 76*b* of support body portions 72*a*, 72*b* of the pair of locking supports 66*a*, 66*b*.

Locking shaft 70 is a member for moving each of the pair of locking supports 66*a*, 66*b* between the released position and the locked position. As illustrated in FIG. 3 and FIG. 4, locking shaft 70 is formed in an elongated shape and disposed penetrating arm base 22, cam base 36, ring cam 40, and arm base mount 44. Locking shaft 70 is rotatable about the central axis thereof with respect to arm base mount 44.

Locking knob 106 is formed on an upper end portion of locking shaft 70. As illustrated in FIG. 12A to be described later, locking knob 106 is disposed on the topside of arm base 22. A user can rotate locking shaft 70 with respect to arm base mount 44 by pinching locking knob 106 with his or her hand fingers. Eccentric shaft 108 having a center offset from the central axis of locking shaft 70 is formed on a lower end portion of locking shaft 70. As illustrated in FIG. 9, eccentric shaft 108 is rotatably inserted in hole 96 of horizontal portion 86 of locking plate 68.

[1-2-4-2. Operations of Locking Mechanism]

Next, the operations of locking mechanism 18 will be described with reference to FIG. 12A to FIG. 13C. FIG. 12A is a plan view illustrating tonearm unit 12 according to Embodiment 1 with the pair of locking supports 66*a*, 66*b* each in the released position. FIG. 12B is an enlarged view of a portion of locking mechanism 18 according to Embodiment 1 with the pair of locking supports 66*a*, 66*b* each in the released position. FIG. 12C is a cross-sectional view taken along line XII-XII of FIG. 9 with the pair of locking supports 66*a*, 66*b* each in the released position. FIG. 13A is a plan view illustrating tonearm unit 12 according to Embodiment 1 with the pair of locking supports 66*a*, 66*b* each in the locked position. FIG. 13B is an enlarged view of a portion of locking mechanism 18 according to Embodiment 1 with the pair of locking supports 66*a*, 66*b* each in the locked position. FIG. 13C is a cross-sectional view taken along line XII-XII of FIG. 9 with the pair of locking supports 66*a*, 66*b* each in the locked position. Note that for illustrative purposes, illustration of balance weight 32 is omitted in FIG. 12A and FIG. 13A.

In the state illustrated in FIG. 12A to FIG. 12C, each of the pair of locking supports 66*a*, 66*b* is located in the released position. In this state, respective support body portions 72*a*, 72*b* of the pair of locking supports 66*a*, 66*b* are separate from ring rubber 64, and therefore it is possible to rotate ring cam 40 with respect to cam base 36.

In this state, a user pinches locking knob 106 with his or her hand fingers and rotates locking shaft 70 in the direction indicated by arrow R3 in FIG. 13A with respect to arm base mount 44 to lock rotation of ring cam 40 with respect to cam base 36. As a result, eccentric shaft 108 rotates in the direction indicated by arrow R3 in FIG. 13B, about the central axis of locking shaft 70. At this time, eccentric shaft 108 is pressed against a peripheral portion of hole 96 of horizontal portion 86 of locking plate 68, and thus locking plate 68 moves toward the pair of locking supports 66*a*, 66*b*, as indicated by arrow X1 in FIG. 13B. Thus, as illustrated in FIG. 13C, the pair of inclined portions 98*a*, 98*b* of pusher portion 90 respectively push inclined surfaces 76*a*, 76*b* of support body portions 72*a*, 72*b* of the pair of locking supports 66*a*, 66*b*, and each of the pair of locking supports 66*a*, 66*b* moves from the released position to the locked position. At this time, as illustrated in FIG. 13B, cushion member 84 is compressed due to being pressed against respective support body portions 72*a*, 72*b* of the pair of locking supports 66*a*, 66*b*.

As illustrated in FIG. 13A to FIG. 13C, in the state where each of the pair of locking supports 66*a*, 66*b* is located in the locked position, respective support body portions 72*a*, 72*b* of the pair of locking supports 66*a*, 66*b* are in contact with ring rubber 64. Thus, the rotation of ring cam 40 with respect to cam base 36 is locked by a frictional force generated between ring rubber 64 and support body portions 72*a*, 72*b*. At this time, ring rubber 64 elastically deforms due to being pressed against (in contact with) support body portions 72*a*, 72*b*.

In this state, a user pinches locking knob 106 with his or her hand fingers and rotates locking shaft 70 in the direction indicated by arrow R4 in FIG. 12A with respect to arm base mount 44 to allow the rotation of ring cam 40 with respect to cam base 36. As a result, eccentric shaft 108 rotates in the direction indicated by arrow R4 in FIG. 12B, about the central axis of locking shaft 70. At this time, eccentric shaft 108 is pressed against a peripheral portion of hole 96 of horizontal portion 86 of locking plate 68, and thus locking plate 68 moves away from the pair of locking supports 66*a*, 66*b*, as indicated by arrow X2 in FIG. 12B. Thus, as illustrated in FIG. 12B and FIG. 12C, each of the pair of locking supports 66a, 66b moves from the locked position to the released position with a repulsive force from cushion member 84.

[1-2-5. Lifter Mechanism]

[1-2-5-1. Configuration of Lifter Mechanism]

Figure 14A:
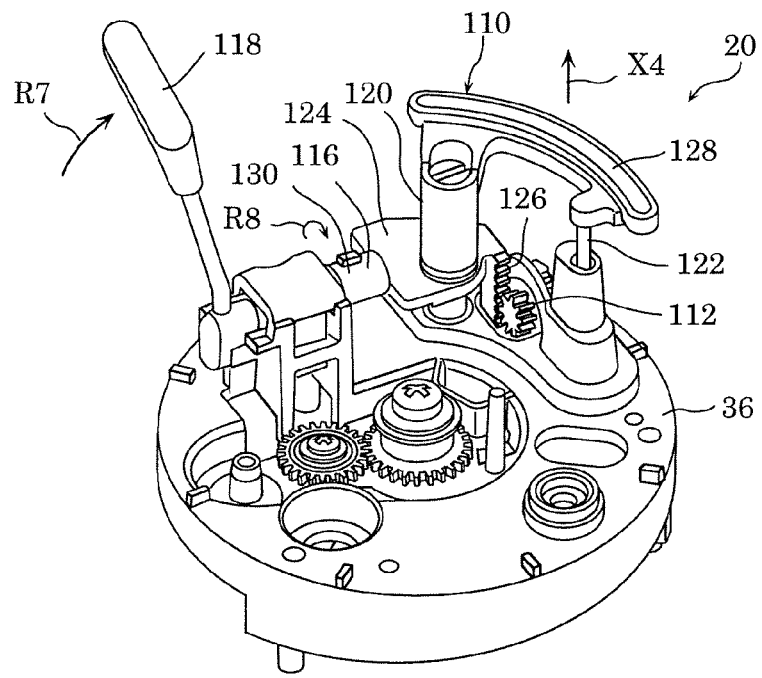
FIG. 14A is a perspective view illustrating a lifter mechanism according to Embodiment 1 with a mounting pedestal in an upper limit position.
Figure 14B:
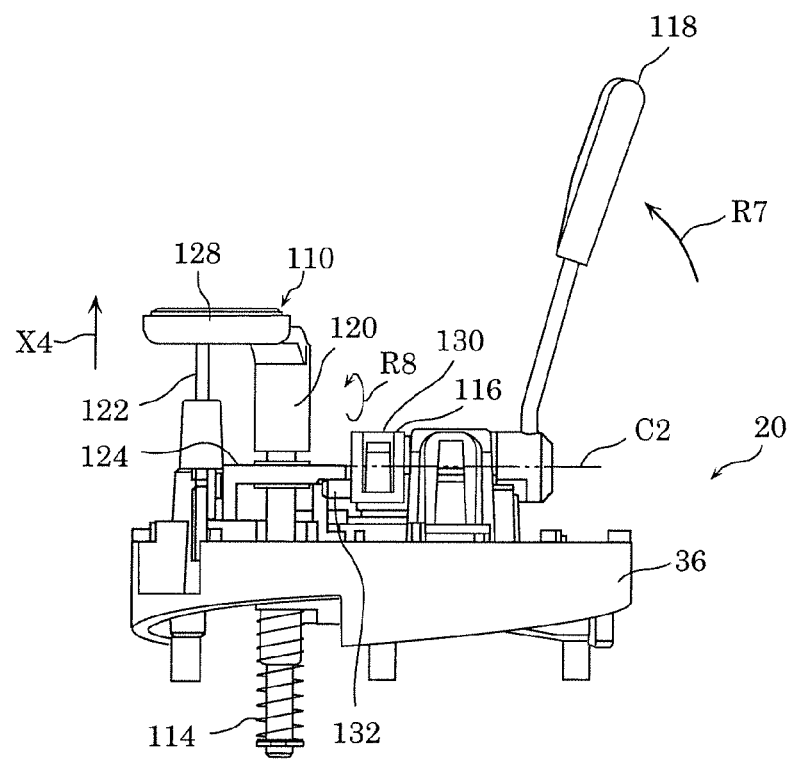
FIG. 14B is a side view illustrating a lifter mechanism according to Embodiment 1 with a mounting pedestal in an upper limit position.
Figure 14C:
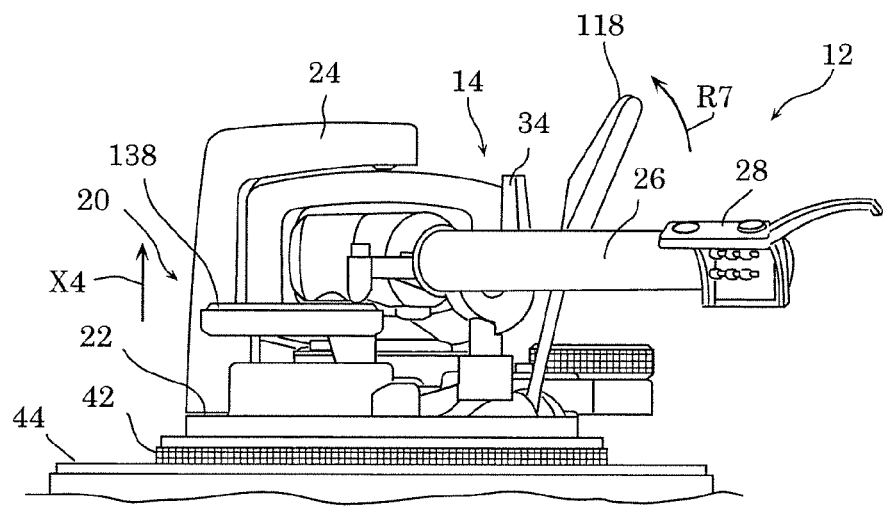
FIG. 14C is a side view illustrating a tonearm unit according to Embodiment 1 with a mounting pedestal in an upper limit position.
Figure 15A:
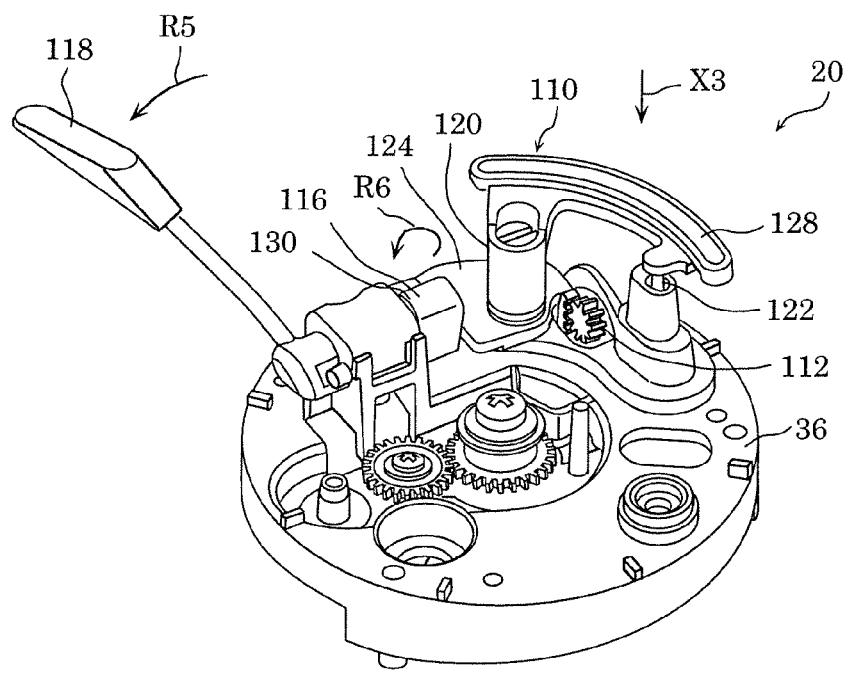
FIG. 15A is a perspective view illustrating a lifter mechanism according to Embodiment 1 with a mounting pedestal in a lower limit position.
Figure 15B:
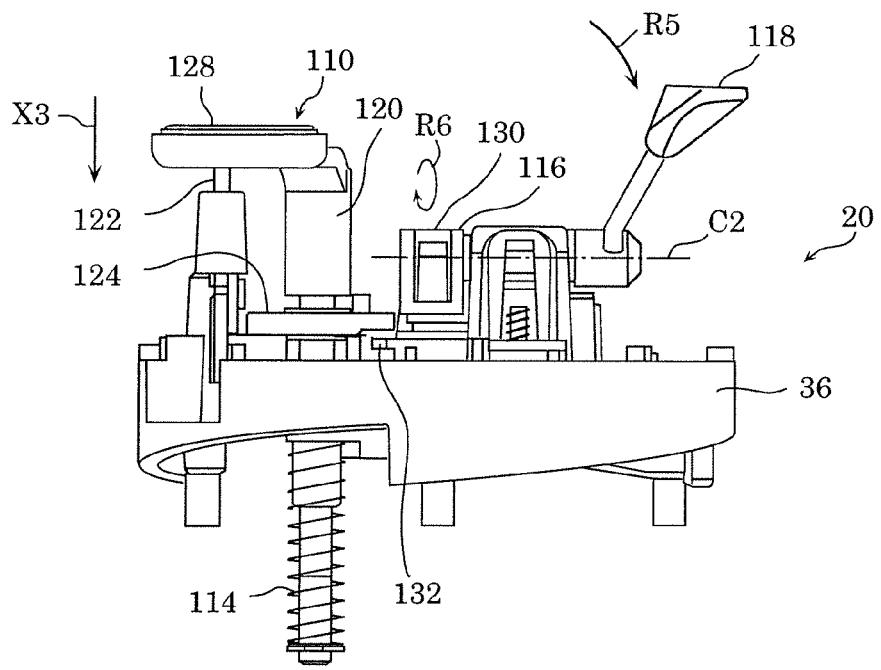
FIG. 15B is a side view illustrating a lifter mechanism according to Embodiment 1 with a mounting pedestal in a lower limit position.
Figure 15C:
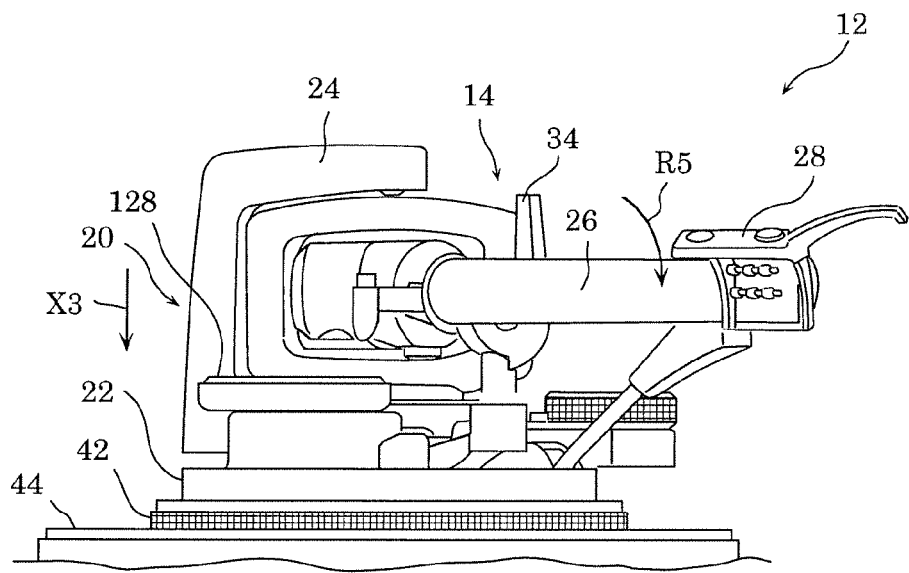
FIG. 15C is a side view illustrating a tonearm unit according to Embodiment 1 with a mounting pedestal in a lower limit position.

Next, the configuration of lifter mechanism 20 will be described with reference to FIG. 14A to FIG. 15C. FIG. 14A is a perspective view illustrating lifter mechanism 20 according to Embodiment 1 with mounting pedestal 128 in an upper limit position. FIG. 14B is a side view illustrating lifter mechanism 20 according to Embodiment 1 with mounting pedestal 128 in the upper limit position. FIG. 14C is a side view illustrating tonearm unit 12 according to Embodiment 1 with mounting pedestal 128 in the upper limit position. FIG. 15A is a perspective view illustrating lifter mechanism 20 according to Embodiment 1 with mounting pedestal 128 in a lower limit position. FIG. 15B is a side view illustrating lifter mechanism 20 according to Embodiment 1 with mounting pedestal 128 in the lower limit position. FIG. 15C is a side view illustrating tonearm unit 12 according to Embodiment 1 with mounting pedestal 128 in the lower limit position. Note that for illustrative purposes, illustrations of arm base 22, arm member 26, etc., are omitted in FIG. 14A, FIG. 14B, FIG. 15A, and FIG. 15B.

Lifter mechanism 20 is for moving down head-shell 28 (the tip of arm member 26) toward phonograph record 4 on turntable 8. As illustrated in FIG. 14A, lifter mechanism 20 includes lift arm base 110, gear damper 112, coil spring 114 (one example of the second biasing member), cam member 116, and lever member 118.

As illustrated in FIG. 14A and FIG. 14B, lift arm base 110 includes a pair of support columns 120, 122, plate member 124, rack gear 126, and mounting pedestal 128. The pair of support columns 120, 122 are supported on cam base 36 in such a manner as to be capable of being raised and lowered, and extend vertically upward from the topside of cam base 36. Plate member 124 is attached to support column 120 and is capable of being raised and lowered together with support column 120. Rack gear 126 extends vertically downward from plate member 124 and is capable of being raised and lowered together with support column 120.

Mounting pedestal 128 is a member for mounting arm member 26 thereon and is supported on respective upper end portions of the pair of support columns 120, 122. By raising and lowering the pair of support columns 120, 122, it is possible to raise and lower mounting pedestal 128 between the upper limit position (refer to FIG. 14A to FIG. 14C) and the lower limit position (refer to FIG. 15A to FIG. 15C). When mounting pedestal 128 is located in the upper limit position, head-shell 28 is separate from phonograph record 4 on turntable 8. When mounting pedestal 128 is located in the lower limit position, head-shell 28 approaches phonograph record 4 on turntable 8, and the record needle contacts the groove of phonograph record 4.

As illustrated in FIG. 14A, gear damper 112 is rotatably supported on the topside of cam base 36. Gear damper 112 is in mesh with rack gear 126 of lift arm base 110. Gear damper 112 applies a braking force (that is, a force exerted against the downward movement of mounting pedestal 128) to mounting pedestal 128 while mounting pedestal 128 is lowered from the upper limit position to the lower limit position.

As illustrated in FIG. 14B, coil spring 114 is disposed covering the outside of support column 120 under cam base 36 and biases mounting pedestal 128 (support column 120) from the upper limit position toward the lower limit position.

As illustrated in FIG. 14A and FIG. 14B, cam member 116 is rotatably supported on the topside of cam base 36. Cam member 116 includes cam body portion 130 and supporting portion 132. Cam body portion 130 rotates about rotation axis C2 extending substantially horizontally. Supporting portion 132 is formed in a position offset from rotation axis C2 of cam body portion 130.

Lever member 118 is coupled to cam body portion 130 of cam member 116. A user can rotate cam member 116 between a first rotational position (refer to FIG. 14A and FIG. 14B) and a second rotational position (refer to FIG. 15A and FIG. 15B) by rotating lever member 118 with his or her hand. As illustrated in FIG. 14B, supporting portion 132 supports plate member 124 from below when cam member 116 is located in the first rotational position. By doing so, cam member 116 holds mounting pedestal 128 in the upper limit position. As illustrated in FIG. 15B, supporting portion 132 does not support plate member 124 from below when cam member 116 is located in the second rotational position. By doing so, cam member 116 releases holding of mounting pedestal 128 in the upper limit position.

[1-2-5-2. Operations of Lifter Mechanism]

Next, the operations of lifter mechanism 20 will be described with reference to FIG. 14A to FIG. 15C.

In the state illustrated in FIG. 14A to FIG. 14C, cam member 116 is located in the first rotational position, and mounting pedestal 128 is held in the upper limit position. For example, in order to play phonograph record 4, a user rotates lever member 118 in the direction indicated by arrow R5 in FIG. 15A to FIG. 15C in the state where turntable 8 is rotating. Accordingly, cam member 116 rotates from the first rotational position to the second rotational position in the direction indicated by arrow R6 in FIG. 15A and FIG. 15B. As a result, mounting pedestal 128 is lowered from the upper limit position to the lower limit position in the direction indicated by arrow X3 in FIG. 15A to FIG. 15C in the state where arm member 26 is mounted on mounting pedestal 128 with a biasing force from coil spring 114. At this time, mounting pedestal 128 is gradually lowered from the upper limit position to the lower limit position with the braking force applied by gear damper 112, allowing the record needle to gradually approach phonograph record 4. As a result, the playback of phonograph record 4 can be started smoothly.

For example, when the playback of phonograph record 4 is completed, a user rotates lever member 118 in the state illustrated in FIG. 15A to FIG. 15C in the direction indicated by arrow R7 in FIG. 14A to FIG. 14C. Accordingly, cam member 116 rotates from the second rotational position to the first rotational position in the direction indicated by arrow R8 in FIG. 14A and FIG. 14B. As a result, mounting pedestal 128 is pushed up by supporting portion 132 of cam member 116 and thus is raised from the lower limit position to the upper limit position in the direction indicated by arrow X4 in FIG. 14A to FIG. 14C in the state where arm member 26 is mounted on mounting pedestal 128. This allows the record needle to separate from phonograph record 4.

[1-3. Advantageous Effects, Etc.]

As described above, in the present embodiment, tonearm unit 12 is used in playback device 2 which plays phonograph record 4. Tonearm unit 12 includes: arm member 26 having a tip to which cartridge 30 is attached; and raising and lowering mechanism 16 which raises and lowers arm member 26 with respect to phonograph record 4 along a predetermined axis. Raising and lowering mechanism 16 includes: cam base 36 which supports arm member 26; ring cam 40 provided to be rotatable about the predetermined axis with respect to cam base 36; first guide portion 48 on cam base 36, extending at an angle along a rotation direction of ring cam 40; and second guide portion 56 on ring cam 40, extending at an angle along the rotation direction so as to face first guide portion 48. When ring cam 40 rotates with respect to cam base 36, cam base 36 is raised and lowered with respect to ring cam 40 as a result of second guide portion 56 sliding along first guide portion 48.

Thus, by disposing cam base 36 and ring cam 40 so that first guide portion 48 and second guide portion 56 face each other, raising and lowering mechanism 16 can be easily incorporated into tonearm unit 12. Note that in an existing playback device including a tonearm unit, it is possible to change only the structure of raising and lowering mechanism 16 without significant changes in appearance. This should lead to a high level of satisfaction of users who like classic appearance of an existing playback device.

Furthermore, in the present embodiment, raising and lowering mechanism 16 further includes: groove portion 58 in ring cam 40, extending along second guide portion 56; protruding portion 50 on cam base 36, movably inserted in groove portion 58; and cam spacer 59 attached to a tip of protruding portion 50.

Thus, withdrawals of protruding portion 50 from groove portion 58 can be reduced using cam spacer 59. As a result, it is possible to reduce the occurrence of accidental detachment of cam base 36 from ring cam 40 when ring cam 40 rotates with respect to cam base 36.

Furthermore, in the present embodiment, a plurality of first guide portions 48 are arranged side by side along the rotation direction, and a plurality of second guide portions 56 are arranged side by side along the rotation direction.

This allows cam base 36 to be stably raised and lowered with respect to ring cam 40 when ring cam 40 rotates with respect to cam base 36.

Furthermore, in the present embodiment, tonearm unit 12 further includes locking mechanism 18 which locks rotation of ring cam 40 with respect to cam base 36. Locking mechanism 18 includes: ring rubber 64 disposed on an outside of ring cam 40; locking supports 66a, 66b movable between a locked position in which locking supports 66a, 66b contact ring rubber 64 and a released position in which locking supports 66a, 66b separate from ring rubber 64; and locking shaft 70 which moves locking supports 66a, 66b between the locked position and the released position.

Thus, when locking supports 66a, 66b move from the released position to the locked position, locking supports 66a, 66b contact ring rubber 64, causing elastic deformation of ring rubber 64. As a result, even when there are dimensional variations in locking supports 66a, 66b, etc., these dimensional variations can be absorbed by the amount of elastic deformation of ring rubber 64, and therefore it is possible to reliably bring locking supports 66a, 66b into contact with ring rubber 64.

Furthermore, in the present embodiment, ring rubber 64 is formed from a rubber material and extends in a ring shape along an entire perimeter of the outside of ring cam 40.

Thus, it is possible to reliably bring locking supports 66a, 66b into contact with ring rubber 64 independently of the rotational position of ring cam 40 relative to cam base 36.

In the present embodiment, tonearm unit 12 further includes lifter mechanism 20 which lowers the tip of arm member 26 toward phonograph record 4. Lifter mechanism 20 includes: mounting pedestal 128 on which arm member 26 is mounted and which is capable of being raised and lowered between an upper limit position for separating the tip of arm member 26 from phonograph record 4 and a lower limit position for causing the tip of arm member 26 to approach phonograph record 4; and gear damper 112 which applies a braking force to mounting pedestal 128 while mounting pedestal 128 is lowered from the upper limit position to the lower limit position.

Thus, mounting pedestal 128 is gradually lowered from the upper limit position to the lower limit position with the braking force applied by gear damper 112, allowing the tip of arm member 26 to gradually approach phonograph record 4. As a result, the playback of phonograph record 4 can be started smoothly.

Furthermore, in the present embodiment, lifter mechanism 20 further includes: coil spring 114 which biases mounting pedestal 128 from the upper limit position toward the lower limit position; cam member 116 which rotates between a first rotational position for holding mounting pedestal 128 in the upper limit position and a second rotational position for releasing holding of mounting pedestal 128 in the upper limit position; and lever member 118 which rotates cam member 116 between the first rotational position and the second rotational position.

With this, a user can easily raise and lower mounting pedestal 128 between the upper limit position and the lower limit position by operating lever member 118.

Furthermore, in the present embodiment, playback device 2 which plays phonograph record 4 includes: turntable 8 on which phonograph record 4 is placed; drive source 10 which rotates turntable 8; and one of above-described tonearm units 12 each of which picks up an audio signal from phonograph record 4 placed on turntable 8 that is rotating.

Thus, by disposing cam base 36 and ring cam 40 so that first guide portion 48 and second guide portion 56 face each other, raising and lowering mechanism 16 can be easily incorporated into tonearm unit 12. Note that in an existing playback device including a tonearm unit, it is possible to change only the structure of raising and lowering mechanism 16 without significant changes in appearance. This should lead to a high level of satisfaction of users who like classic appearance of an existing playback device.

Embodiment 2

Next, Embodiment 2 will be described with reference to FIG. 16 to FIG. 20. Note that in Embodiment 2, structural elements that are the same as in Embodiment 1 described above have the same reference numerals as in Embodiment 1, and description of such structural elements will be omitted.

[2-1. Configuration of Locking Mechanism]

Figure 16:
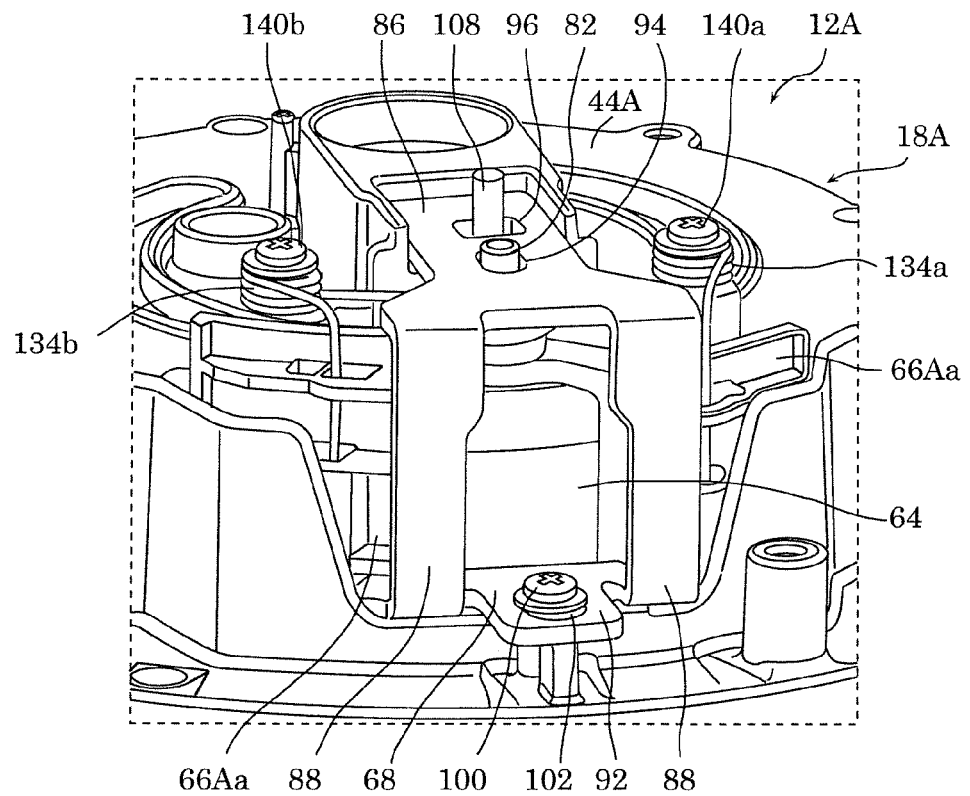
FIG. 16 is a perspective view illustrating a locking mechanism according to Embodiment 2.
Figure 17:
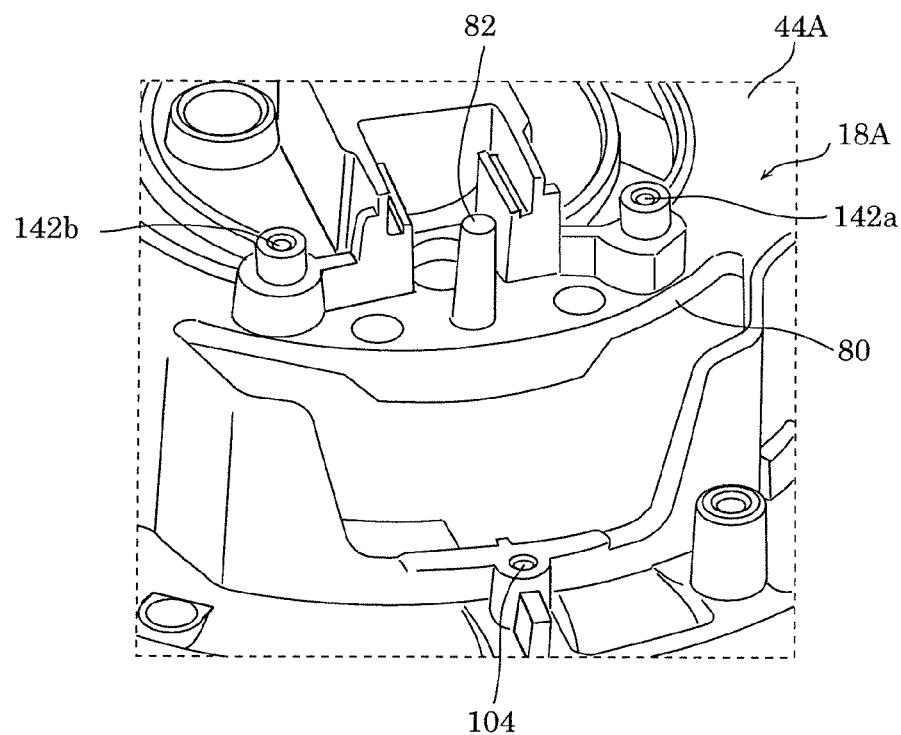
FIG. 17 is a perspective view illustrating a locking mechanism according to Embodiment 2 in which a pair of locking supports, a locking plate, etc. are omitted.
Figure 18:
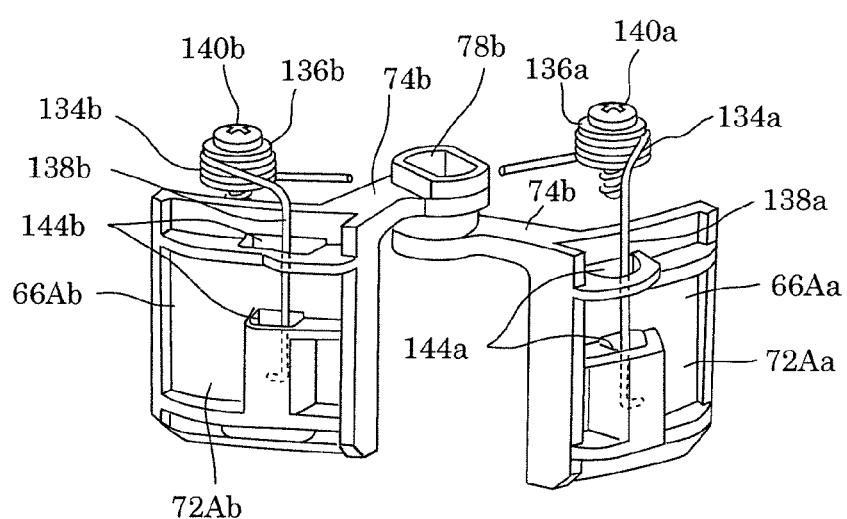
FIG. 18 is a perspective view illustrating a portion of a locking mechanism according to Embodiment 2.

The configuration of locking mechanism 18A in tonearm unit 12A according to Embodiment 2 will be described with reference to FIG. 16 to FIG. 18. FIG. 16 is a perspective view illustrating locking mechanism 18A according to Embodiment 2. FIG. 17 is a perspective view illustrating locking mechanism 18A according to Embodiment 2 in which a pair of locking supports 66Aa, 66Ab, locking plate 68, etc. are omitted. FIG. 18 is a perspective view illustrating a portion of locking mechanism 18A according to Embodiment 2. Note that for illustrative purposes, illustrations of jack base 62, etc., are omitted in FIG. 16 and FIG. 17.

As illustrated in FIG. 16, locking mechanism 18A includes a pair of spring members 134a, 134b (one example of the first biasing member) in addition to locking mechanism 18 according to Embodiment 1 described above.

As illustrated in FIG. 16 and FIG. 18, spring member 134a includes: torsion spring portion 136a in a coil shape; and wire spring portion 138a which extends from torsion spring portion 136*a*. As illustrated in FIG. 16 and FIG. 17, screw 140*a* is screwed through torsion spring portion 136*a* into screw hole 142*a* formed in arm base mount 44A, and thus torsion spring portion 136*a* is attached to arm base mount 44A. As illustrated in FIG. 16 and FIG. 18, wire spring portion 138*a* is inserted in opening 144*a* formed in support body portion 72Aa of locking support 66Aa.

Spring member 134*b* is formed laterally mirrored with spring member 134*a* describe above. Specifically, as illustrated in FIG. 16 and FIG. 18, spring member 134*b* includes torsion spring portion 136*b* in a coil shape; and wire spring portion 138*b* which extends from torsion spring portion 136*b*. As illustrated in FIG. 16 and FIG. 17, screw 140*b* is screwed through torsion spring portion 136*b* into screw hole 142*b* formed in arm base mount 44A, and thus torsion spring portion 136*b* is attached to arm base mount 44A. As illustrated in FIG. 16 and FIG. 18, wire spring portion 138*b* is inserted in opening 144*b* formed in support body portion 72Ab of locking support 66Ab.

[2-2. Operations of Locking Mechanism]

Figure 19:
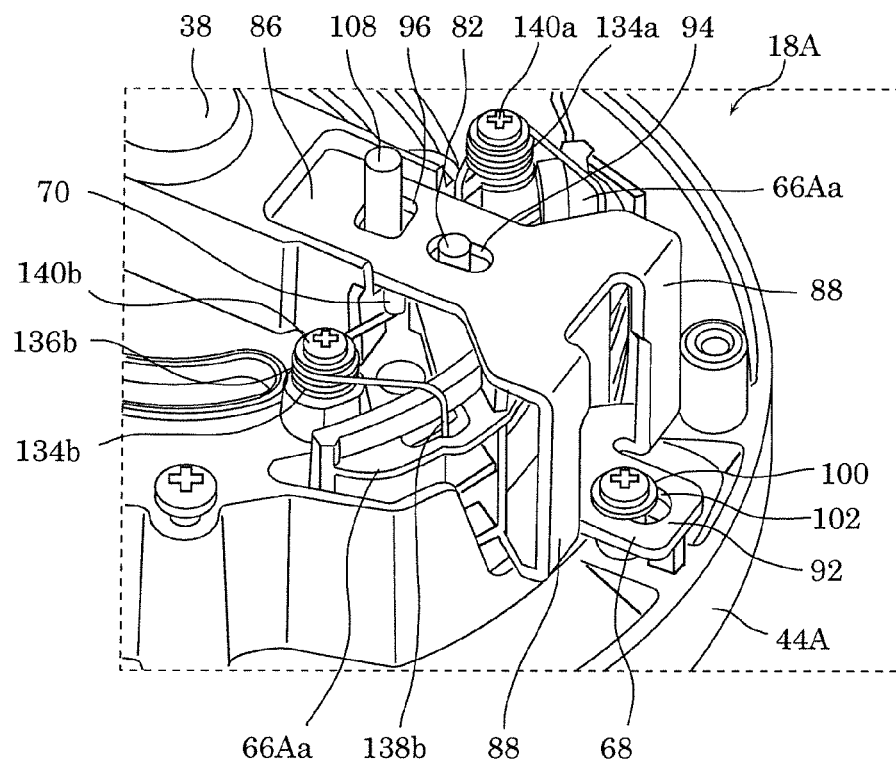
FIG. 19 is a perspective view illustrating a locking mechanism according to Embodiment 2 with a pair of locking supports each in a released position.
Figure 20:
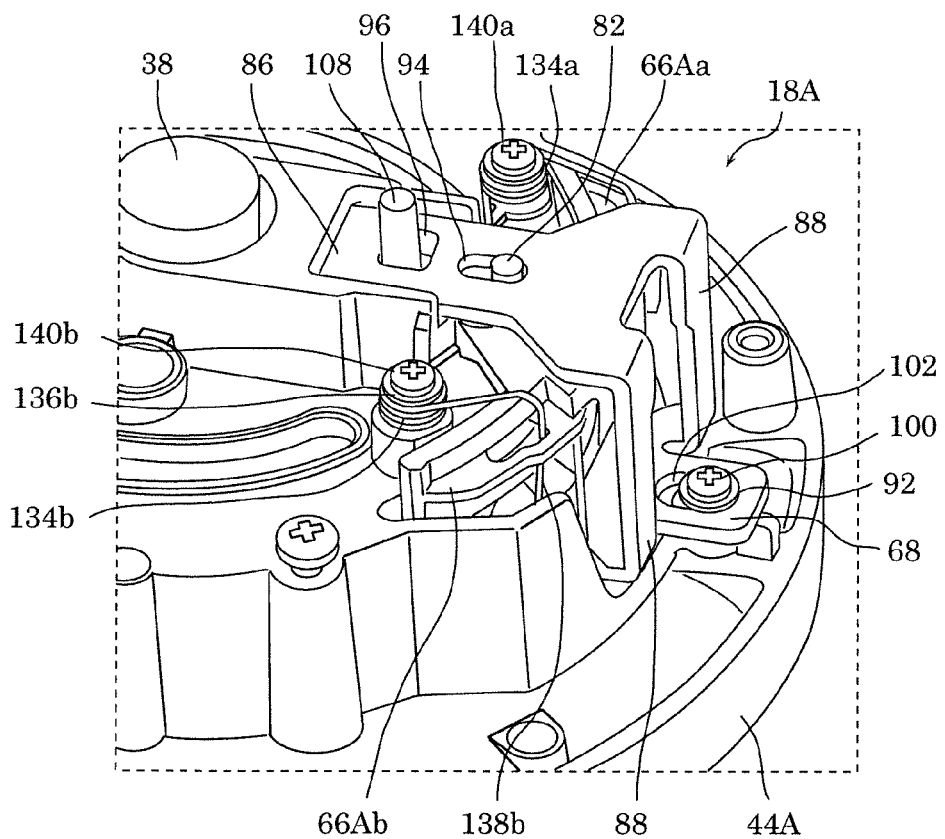
FIG. 20 is a perspective view illustrating a locking mechanism according to Embodiment 2 with a pair of locking supports each in a locked position.

Next, the operations of locking mechanism 18A will be described with reference to FIG. 19 to FIG. 20. FIG. 19 is a perspective view illustrating locking mechanism 18A according to Embodiment 2 with a pair of locking supports 66Aa, 66Ab each in the released position. FIG. 20 is a perspective view illustrating locking mechanism 18A according to Embodiment 2 with the pair of locking supports 66Aa, 66Ab each in the locked position. Note that for illustrative purposes, illustrations of jack base 62, etc., are omitted in FIG. 19 and FIG. 20.

In the state illustrated in FIG. 19, each of the pair of locking supports 66Aa, 66Ab is located in the released position. In this state, when a user rotates locking shaft 70 in a predetermined direction with respect to arm base mount 44A, each of the pair of locking supports 66Aa, 66Ab moves from the released position to the locked position, as illustrated in FIG. 20. At this time, each of wire spring portion 138*a* of spring member 134*a* and wire spring portion 138*b* of spring member 134*b* is elastically deformed due to being pressed against the pair of locking supports 66Aa, 66Ab. Note that torsion spring portion 136*a* of spring member 134*a* and torsion spring portion 136*b* of spring member 134*b* barely elastically deform.

In the state illustrated in FIG. 20, when a user rotates locking shaft 70 in a direction opposite to the aforementioned predetermined direction with respect to arm base mount 44A, each of the pair of locking supports 66Aa, 66Ab moves from the locked position to the released position with elastic restoring forces from wire spring portion 138*a* of spring member 134*a* and wire spring portion 138*b* of spring member 134*b*, as illustrated in FIG. 19.

[2-3. Advantageous Effects, Etc.]

In the present embodiment, locking mechanism 18A further includes spring members 134*a*, 134*b* which bias locking supports 66Aa, 66Ab from the locked position toward the released position.

With this, even when ring rubber 64 is adhesive, for example, locking supports 66Aa, 66Ab can be easily detached from ring rubber 64 with biasing forces from spring member 134*a*, 134*b*.

Other Embodiments

As described above, Embodiments 1 and 2 are presented as exemplifications of the technique disclosed in the present application. However, the technique in the present disclosure is not limited to such embodiments, and is also applicable to embodiments obtained by carrying out modification, substitution, addition, and omission as necessary. Furthermore, it is also possible to obtain a new embodiment by combining respective structural elements described in above Embodiments 1 and 2.

Examples of other embodiments include the following.

In each of the above embodiments, the gap is formed between first guide portion 48 and second guide portion 56, but this is not limiting; first guide portion 48 and second guide portion 56 may be in contact (close contact) with each other.

As described above, the embodiments are presented as exemplifications of the technique according to the present disclosure. The accompanying drawings and detailed description are provided for this purpose.

Therefore, the structural elements described in the accompanying drawings and detailed description may include, not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiments are for exemplifying the technique according to the present disclosure, various modifications, substitutions, additions, omissions, and so on, can be carried out within the scope of the Claims or equivalents thereof.

INDUSTRIAL APPLICABILITY

The present disclosure can be applied to a tonearm unit used in a playback device for playing a phonograph record.

The invention claimed is:

1. A tonearm unit used in a playback device which plays a phonograph record, the tonearm unit comprising:
    an arm member having a tip to which a cartridge is attached; and
    a raising and lowering mechanism which raises and lowers the arm member with respect to the phonograph record along a predetermined axis, wherein
    the raising and lowering mechanism includes:
        a supporting member which supports the arm member;
        a rotating member provided to be rotatable about the predetermined axis with respect to the supporting member;
        a first guide portion on the supporting member, the first guide portion extending in a circular arc shape and which slopes upwardly from a peak portion to a valley portion along a rotation direction of the rotating member; and
        a second guide portion on the rotating member, the second guide portion facing the first guide portion and extending in a circular arc shape and which slopes upwardly from a valley portion to a peak portion along the rotation direction, and
    when the rotating member rotates with respect to the supporting member, the supporting member is raised and lowered with respect to the rotating member as a result of the second guide portion sliding along the first guide portion.

2. The tonearm unit according to claim 1, wherein the raising and lowering mechanism further includes:
    a groove portion in the rotating member, the groove portion extending along the second guide portion;

a protruding portion on the supporting member, the protruding portion being movably inserted in the groove portion; and a withdrawal prevention member attached to a tip of the protruding portion.

3. The tonearm unit according to claim 1, wherein a plurality of the first guide portions are arranged side by side along the rotation direction, and a plurality of the second guide portions are arranged side by side along the rotation direction.

4. The tonearm unit according to claim 1, further comprising:

a locking mechanism which locks rotation of the rotating member with respect to the supporting member, wherein the locking mechanism includes:

an elastic member disposed on an outside of the rotating member;

a contacting member movable between a locked position in which the contacting member contacts the elastic member and a released position in which the contacting member separates from the elastic member; and an operating member which moves the contacting member between the locked position and the released position.

5. The tonearm unit according to claim 4, wherein the elastic member is formed from a rubber material and extends in a ring shape along an entire perimeter of the outside of the rotating member.

6. The tonearm unit according to claim 4, wherein the locking mechanism further includes a first biasing member which biases the contacting member from the locked position toward the released position.

7. The tonearm unit according to claim 1, further comprising:

a lifter mechanism which lowers the tip of the arm member toward the phonograph record, wherein the lifter mechanism includes:

a mounting pedestal on which the arm member is mounted, the mounting pedestal being capable of being raised and lowered between an upper limit position for separating the tip of the arm member from the phonograph record and a lower limit position for causing the tip of the arm member to approach the phonograph record; and a gear damper which applies a braking force to the mounting pedestal while the mounting pedestal is lowered from the upper limit position to the lower limit position.

8. The tonearm unit according to claim 7, wherein the lifter mechanism further includes:

a second biasing member which biases the mounting pedestal from the upper limit position toward the lower limit position;

a cam member which rotates between a first rotational position for holding the mounting pedestal in the upper limit position and a second rotational position for releasing holding of the mounting pedestal in the upper limit position; and a lever member which rotates the cam member between the first rotational position and the second rotational position.

9. A playback device which plays a phonograph record, the playback device comprising:

a turntable on which the phonograph record is placed;

a drive source which rotates the turntable; and the tonearm unit according to claim 1 which picks up an audio signal from the phonograph record placed on the turntable that is rotating.

10. The tonearm unit according to claim 1, wherein a height dimension of the first guide portion decreases from the peak portion to the valley portion in a first rotational direction, and a height dimension of the second guide portion increases from the valley portion to the peak portion in a second rotational direction.

11. The tonearm unit according to claim 10, wherein the height dimension of the first guide portion continuously decreases from the peak portion to the valley portion in the first rotational direction, and the height dimension of the second guide portion continuously increases from the valley portion to the peak portion in the second rotational direction.

* * * * *